United States Patent
Matsuura et al.

(10) Patent No.: US 7,503,436 B2
(45) Date of Patent: Mar. 17, 2009

(54) DISC BRAKE CONTROL SYSTEM FOR VEHICLE

(75) Inventors: Masahiro Matsuura, Chiryu (JP); Takeyasu Taguchi, Nagoya (JP); Masashi Kishimoto, Chiryu (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 47 days.

(21) Appl. No.: 11/655,147

(22) Filed: Jan. 19, 2007

(65) Prior Publication Data

US 2007/0176489 A1    Aug. 2, 2007

(30) Foreign Application Priority Data

Jan. 19, 2006  (JP)  ............................. 2006-010712
Nov. 1, 2006   (JP)  ............................. 2006-297866

(51) Int. Cl.
*F16D 55/08* (2006.01)

(52) U.S. Cl. ................................. 188/1.11 E

(58) Field of Classification Search ............. 188/1.11 E, 188/1.11 L, 156–162; 303/20; 701/70–72
See application file for complete search history.

(56) References Cited

U.S. PATENT DOCUMENTS

| 6,250,436 | B1 * | 6/2001 | Oikawa et al. ............. 188/72.1 |
| 6,612,736 | B2 * | 9/2003 | Lee et al. .................... 374/153 |
| 6,748,310 | B2 * | 6/2004 | Tamasho et al. ............... 701/70 |
| 7,353,917 | B2 * | 4/2008 | Gripemark et al. ......... 188/18 A |
| 2002/0038742 | A1 * | 4/2002 | Bunker ..................... 188/73.38 |
| 2006/0226698 | A1 * | 10/2006 | Riebe et al. .................. 303/20 |
| 2007/0084682 | A1 * | 4/2007 | Griffith et al. ............... 188/156 |
| 2007/0235268 | A1 * | 10/2007 | Caron ........................ 188/71.8 |

FOREIGN PATENT DOCUMENTS

JP    2004-036657    2/2004

* cited by examiner

*Primary Examiner*—Christopher P Schwartz
(74) *Attorney, Agent, or Firm*—Buchanan Ingersoll & Rooney PC

(57) ABSTRACT

In a disc brake control system for a vehicle, a control unit determines that a brake disc is in a condition of a thermal inclination of brake disc, and further determines that the brake disc is restored from the thermal inclination. The control unit operates an actuator of a disc brake devices to push a brake pad to the brake disc, when it determines that the brake disc is restored from the thermal inclination. According to such operation, the brake pad is moved to its normal position to the brake disc, so that a brake drag of the brake pad to the brake disc is suppressed.

15 Claims, 11 Drawing Sheets

RESTORED CONDITION FROM THERMAL INCLINATION

SMALL PRESSURE APPLIED CONDITION

RESTORED CONDITION
FROM THERMAL INCLINATION

SMALL PRESSURE
APPLIED CONDITION

NORMAL CONDITION

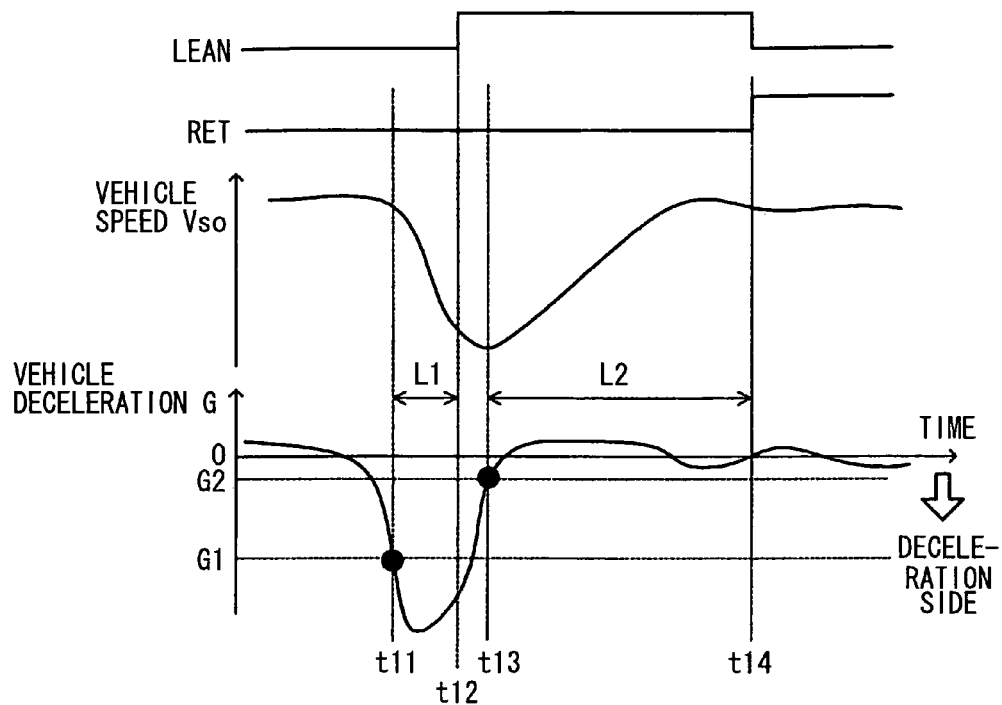
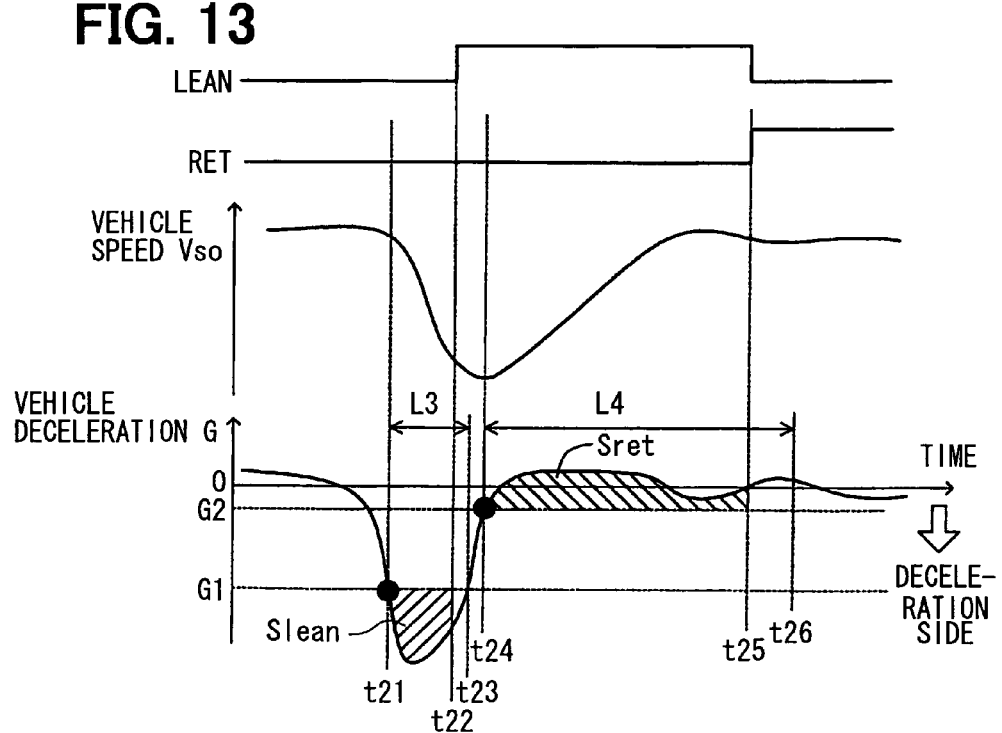

NORMAL CONDITION

THERMAL INCLINATION

RESTORED CONDITION
FROM THERMAL INCLINATION

US 7,503,436 B2

DISC BRAKE CONTROL SYSTEM FOR VEHICLE

CROSS REFERENCE TO RELATED APPLICATION

This application is based on Japanese Patent Application Nos. 2006-010712 filed on Jan. 19, 2006, and 2006-297866 filed on Nov. 1, 2006, the disclosures of which are incorporated herein by reference.

FIELD OF THE INVENTION

The present invention relates to a disc brake control system for a vehicle.

BACKGROUND OF THE INVENTION

A disc brake device is conventionally known in the art, wherein the disc brake device has a brake disc to be rotated together with a vehicle wheel, a brake pad to be pushed against a sliding surface of the brake disc, and an actuator for pushing the brake pad toward the brake disc.

FIGS. 14A to 14C and 15 are cross sectional views showing a major portion of a disc brake device of a movable caliper type, in which brake fluid pressure is used. In the disc brake device of this movable caliper type, a movable caliper C is arranged such that a relative movement of the movable caliper C to a mounting member (not shown), which is fixed to a vehicle body, is allowed only in an axial direction (a right-left direction in the drawing) of a brake disc D.

When the brake fluid pressure is applied to a wheel cylinder W (in FIG. 15) provided in the movable caliper C, a piston Pis is moved toward an inside sliding surface of the brake disc D (in a leftward direction in the drawing), wherein the piston Pis is slidably and fluid-tightly arranged in the wheel cylinder W by a piston seal S.

Accordingly, an inner pad Pin, which is fixed to a left-hand end of the piston Pis, is pushed against the inside sliding surface of the brake disc D. At the same time, the movable caliper C is moved in the opposite direction to that of the piston Pis (in a rightward direction in the drawing) upon receiving a reaction force from the piston Pis. As a result, an outer pad Pout, which is integrally fixed to the movable caliper C, is pushed against an outside sliding surface of the brake disc D.

As above, when the brake fluid pressure is applied to the wheel cylinder W, the inner and outer pads Pin and Pout are respectively pushed to the inside and outside sliding surfaces of the brake disc D in the opposing direction. The brake disc D is thereby held by and between the inner and outer pads Pin and Pout in proportion to the applied brake fluid pressure, so that a braking force is applied to a vehicle wheel corresponding to the applied brake fluid pressure.

FIG. 14A shows positions of the inner pad Pin, the outer pad Pout (i.e. the caliper C), and the brake disc D in a normal condition, wherein the applied brake fluid pressure is released from the wheel cylinder.

As shown in FIG. 14A, in the normal condition of the brake disc apparatus, a space is formed not only between the inner pad Pin and the inside sliding surface of the brake disc D, but also between the outer pad Pout and the outside sliding surface of the brake disc D. In particular, the space is formed between the inner pad Pin and the inside sliding surface of the brake disc D due to the following reasons.

When the piston Pis is moved toward the inside sliding surface of the brake disc D (i.e. in the leftward direction in the drawing) by the brake fluid pressure applied to the wheel cylinder W, the piston seal S is elastically deformed and held at its elastically deformed shape, wherein the piston seal S is elastically deformed in the direction toward the inside sliding surface of the brake disc D. When the brake fluid pressure is released in this condition, the piston seal S is restored to its initial shape by a restoring force due to the elastic deformation.

The piston Pis is relatively largely moved by the restoring force of the piston seal S in the direction away from the inside sliding surface of the brake disc D (i.e. in the rightward direction in the drawing), so that the space is formed between the inner pad Pin and the inside sliding surface of the brake disc D.

In the above normal condition shown in FIG. 14A, a brake drag (unfavorable frictional sliding) of the brake disc D is not generally generated. The brake drag of the brake disc D refers to such a condition in which the vehicle wheel (i.e. the brake disc D) is rotated while a brake pad is partly in contact with a sliding surface of a brake disc. Accordingly, in the normal condition of the brake disc (FIG. 14A), unfavorable abrasion of the brake pad (the inner and outer pads Pin and Pout) as well as the sliding surface of the brake disc D can be suppressed. Furthermore, a fade for the brake pad does not occur, in the normal condition.

A temperature of the brake disc is increased by the frequent braking operation. A thermal inclination of brake disc may occur at the brake disc D, when the temperature of the brake disc D is extremely increased. The thermal inclination of brake disc refers to a phenomenon, in which the sliding surface of the brake disc D is inclined, for example, as disclosed in Japanese Patent Publication No. 2004-36657. The thermal inclination of brake disc is also simply referred to as the thermal inclination.

FIG. 14B shows positions of the inner pad Pin, the outer pad Pout (i.e. the caliper C), and the brake disc D in the above thermal inclination, wherein the applied brake fluid pressure is released from the wheel cylinder. As shown in FIG. 14B, the sliding surface of the brake disc D is inclined toward the outside of the vehicle body. As seen from FIG. 14B, the brake drag may easily occur at corners of the respective brake pads (the inner pad Pin, the outer pad Pout).

The temperature of the brake disc D is decreased when the vehicle runs without braking operation, wherein the brake disc D is cooled by travel wind. Then, the brake disc D is restored from the thermal inclination to the normal condition.

FIG. 14C (as well as FIG. 15, showing an enlarged major portion of FIG. 14C) shows positions of the inner pad Pin, the outer pad Pout (i.e. the caliper C), and the brake disc D in a restored condition, wherein the applied brake fluid pressure is released from the wheel cylinder. Namely, the brake disc D is restored from the thermal inclination shown in FIG. 14B to the restored condition, as a result that the vehicle has run without braking operation.

As shown in FIG. 14C (and FIG. 15), the space is formed between the outer pad Pout and the outside sliding surface of the brake disc D. This is because the sliding surface of the brake disc D (having been inclined outwardly) is gradually restored to its initial (normal) shape, as the temperature of the brake disc D is decreased, and the outside sliding surface of the brake disc D is separated from the outer pad Pout. In other wards, the brake drag between the outer pad Pout and the outside sliding surface of the brake disc D may not be easily generated.

On the other hand, the brake drag between the inner pad Pin and the inside sliding surface of the brake disc D may be easily generated in the restored condition. This is because the inside sliding surface of the brake disc D pushes the inner pad Pin in the rightward direction in the drawing (namely the inside sliding surface of the brake disc D is brought into contact with the inner pad Pin), when the sliding surface of the brake disc D (having been inclined outwardly) is gradually restored to its initial (normal) shape, as the temperature of the brake disc D is decreased. Furthermore, it is because there is no movement of the inner pad Pin (as well as the piston Pis) by the restoring force of the piston seal S in the rightward direction in the drawing. Accordingly, the unfavorable abrasion of the inner pad Pin as well as the inside sliding surface of the brake disc D is likely to occur. And the fade for the inner pad Pin is also likely to occur.

As above, the position of the brake pads (Pin and Pout) relative to the brake disc (D) in the restored condition (FIG. 14C) from the thermal inclination is different from the position of the normal condition (FIG. 14A), which may cause a problem of the brake drag of the brake pads against the brake disc.

SUMMARY OF THE INVENTION

The present invention is made in view of the foregoing problems, and has an object to provide a disc brake control system for a vehicle, according to which occurrence of a brake drag of a brake pad is suppressed even in a restored condition of the brake disc from a thermal inclination thereof, so that unfavorable abrasion of the brake pad as well as the brake disc is suppressed and the fade for the brake pad is also suppressed.

The disc brake control system for the vehicle according to the present invention can be applied to a disc brake device having a brake disc, a brake pad, and an actuator for pushing the brake pad to the brake disc.

A caliper type device and an opposed-piston type (a fixed caliper type) device are known as the disc brake device. And, an actuator for using brake fluid pressure (having a wheel cylinder formed in the caliper, a piston movably held in the wheel cylinder and moved by the brake fluid pressure, and a brake pad integrally formed with the piston), or an actuator for using an electric motor is known as the actuator for driving the brake pad.

According to one of features of the present invention, the disc brake control system has a step (or means) for determining whether a brake disc is in a condition of a thermal inclination, a step (or means) for determining whether the brake disc is in a restored condition from the thermal inclination, and a step (or means) for operating an actuator (independently from a brake pedal operation by a vehicle driver) in order to push a brake pad to a sliding surface of the brake disc, after a control unit determines that the brake disc is restored from the thermal inclination.

According to the above disc brake control system, the brake pad is pushed to the brake disc, when the control unit determines the restored condition from the thermal inclination (namely, when the brake disc is restored to its normal shape). Accordingly, the position of the brake pad is returned to its normal position with respect to the brake disc, after the brake pad has been pushed to the brake disc. As a result, a brake drag of the brake pad is suppressed, the unfavorable abrasion of the brake pad as well as the brake disc is suppressed, and the fade for the brake pad is also suppressed.

A pushing force for pushing the brake pad to the brake disc is preferably a smaller force, which is, however, large enough to move the brake pad so that the brake pad is brought into contact with a sliding surface of the brake disc. As a result, a braking force generated by the pushing force for pushing the brake pad to the brake disc can be maintained at its minimum value. The braking force is also referred to as a braking force for correcting a pad position. Accordingly, any uncomfortable feeling, which the vehicle driver would otherwise receive from the braking force for correcting the pad position, can be minimized.

According to another feature of the invention, the actuator may be preferably operated to push the brake pad to the brake disc, only when a vehicle operating condition is in a condition in which the vehicle driver can not easily feel the braking force for correcting the pad position. With such an operation, any uncomfortable feeling, which the vehicle driver would otherwise receive from the braking force for correcting the pad position, can be further made smaller.

The vehicle operating condition, in which the vehicle driver can not easily feel the braking force for correcting the pad position, may be, for example, a condition in which a vehicle behavior is changed, a condition in which a vehicle acceleration or deceleration is changed, and so on.

According to a further feature of the invention, the disc brake control system may have a step (or means) for determining whether an engine brake operation is carried out or not, and the actuator is preferably operated to push the brake pad to the brake disc, when the control unit determines that the engine brake operation is carried out.

According to a further feature of the invention, an adjusting device may be provided for adjusting a braking force applied to the vehicle by the engine brake operation, and the adjusting device is preferably operated for a period during which the brake pad is pushed to the brake disc, so that the braking force by the engine brake operation is decreased by such an amount, which corresponds to the braking force for correcting the pad position.

According to the above operation, the total braking force applied to the vehicle can be controlled at such a value, which corresponds to the braking force applied to the vehicle by the engine braking operation alone, during the period in which the brake pad is pushed to the brake disc. Accordingly, the uncomfortable feeling, which the vehicle driver would otherwise receive from the braking force for correcting the pad position, can be furthermore made smaller.

According to a further feature of the invention, a step (or means) for determining whether the vehicle is in an accelerating condition may be provided, and the brake pad may be pushed to the brake disc, when the vehicle is in the accelerating condition.

In such a case, an output power control device may be provided for controlling a driving power outputted from the engine, and the driving power from the engine may be increased by such an amount, which corresponds to the braking force for correcting the pad position, during the period in which the brake pad is pushed to the brake disc.

According to the above operation, the substantial amount of the vehicle driving force applied to the vehicle can be controlled at such a value, which corresponds to the vehicle driving force obtained by the engine operation by itself, during the period in which the brake pad is pushed to the brake disc.

Accordingly, the uncomfortable feeling, which the vehicle driver would otherwise receive from the braking force for correcting the pad position, can be likewise made smaller.

According to a further feature of the invention, a step (or means) for determining whether the vehicle is running on a punishing road may be alternatively provided, and the brake pad may be pushed to the brake disc, when the vehicle is running on the punishing road.

When the vehicle is running on the punishing road, the vehicle acceleration and/or deceleration is changing every second. Accordingly, the vehicle driver can not easily feel or sense the braking force for correcting the pad position during this vehicle running condition. Namely, the uncomfortable feeling, which the vehicle driver would otherwise receive from the braking force for correcting the pad position, can be also made smaller.

According to a still further feature of the invention, a temperature detecting device may be provided in the disc brake control system for detecting the brake disc temperature, the control unit determines that the brake disc is in the condition of the thermal inclination, when the brake disc temperature exceeds a first preset temperature, and the control unit further determines that the brake disc is restored from the thermal inclination, when the brake disc temperature becomes lower than a second preset temperature, wherein the second preset temperature is lower than the first preset temperature.

According to the above feature, the determination for the thermal inclination and for the restored condition from the thermal condition can be done more appropriately. The condition of the thermal inclination means such a condition that the sliding surface of the brake disc is inclined by an angle more than a first predetermined angle. The restored condition from the thermal inclination means such a condition that the sliding surface of the brake disc is inclined by an angle smaller than a second predetermined angle, which is smaller than the first predetermined angle.

According to a further feature of the invention, the temperature detecting device may be composed of a temperature sensor for physically and directly detecting the brake disc temperature.

Alternatively, the temperature detecting device may be composed of a computer program. According to the computer program, the brake disc temperature may be estimated based on a speed of thermal storage (the temperature increasing gradient) to the brake disc, which is obtained from the vehicle deceleration caused by the brake pedal operation of the vehicle driver, and a speed of heat radiation (the temperature decreasing gradient) from the brake disc, which is obtained from the vehicle speed. According to such temperature detecting device (i.e. the computer program), the temperature sensor is not necessary, so that the cost for the system can be made lower.

According to a further feature of the invention, a deceleration detecting device may be provided in the disc brake control system for detecting a vehicle deceleration, the control unit determines whether the brake disc is in the condition of the thermal inclination or not, based on a comparison between the vehicle deceleration and a first preset deceleration, and the control unit determines whether the brake disc is restored from the thermal inclination or not, based on a comparison between the vehicle deceleration and a second preset deceleration, wherein the second preset deceleration is smaller than the first preset deceleration in a degree of the deceleration.

Namely, the control unit determines that the brake disc is in the condition of the thermal inclination, when the vehicle deceleration is larger than the first preset deceleration in the degree of the deceleration. The control unit determines that the brake disc is restored from the thermal inclination, when the vehicle deceleration is lower than the second preset deceleration in the degree of the deceleration.

In the operation of the disc brake device during the vehicle running, the pushing force of the brake pad to the brake disc is larger as the degree of the vehicle deceleration becomes larger. Namely, an increasing degree of the brake disc temperature becomes larger, as the degree of the vehicle deceleration becomes larger. Accordingly, the vehicle deceleration can be one of parameters representing rather exactly the increasing degree of the brake disc temperature.

According to the above feature, the determination for the thermal inclination and for the restored condition from the thermal condition can be appropriately done, without directly detecting the brake disc temperature.

According to a further feature of the invention, the determination for the thermal inclination may be done, when a condition in which the vehicle deceleration is larger in the degree of the deceleration than the first preset deceleration is continued for a period longer than a first predetermined period. And the determination for the restored condition from the thermal inclination may be done, when a condition in which the vehicle deceleration is smaller in the degree of the deceleration than the second preset deceleration is continued for a period longer than a second predetermined period.

According to the above feature, an erroneous determination for the thermal inclination or for the restored condition from the thermal inclination, which might otherwise occur due to a temporal disordered signal for the vehicle deceleration, for example, by noises in the signals from the vehicle deceleration sensor to the control unit, can be avoided.

According to a further feature of the invention, the determination for the thermal inclination may be done, when a first time area is larger than a first predetermined value, wherein the first time area is an integrated value of a deviation of the vehicle deceleration in a direction larger in the degree of the deceleration than the first preset deceleration. And the determination for the restored condition from the thermal inclination may be done, when a second time area is larger than a second predetermined value, wherein the second time area is an integrated value of a deviation of the vehicle deceleration in a direction smaller in the degree of the deceleration than the second preset deceleration.

In the above operation, the calculation (the integration) for the first time area starts from a time point, at which the degree of the vehicle deceleration is changed to its larger value and crosses over the first preset deceleration. And the determination for the thermal inclination is done, when the first time area exceeds the first predetermined value within a third predetermined period from the above calculation (integration) starting time point. In the same manner, the calculation (the integration) for the second time area starts from a time point, at which the degree of the vehicle deceleration is changed to its smaller value and crosses over the second preset deceleration. And the determination for the restored condition from the thermal inclination is done, when the second time area exceeds the second predetermined value within a fourth predetermined period from the above calculation (integration) starting time point.

According to the above feature, the erroneous determination for the thermal inclination or for the restored condition from the thermal inclination, which might otherwise occur due to a temporal disordered signal for the vehicle deceleration, for example, by noises in the signals from the vehicle deceleration sensor to the control unit, can be also avoided.

According to a further feature of the invention, each actuator of the disc brake devices may be operated by brake fluid for the disc brake control system, and the same brake fluid pressure may be preferably applied to all of the actuators of the disc brake devices, in order to push the brake pad to the brake disc.

According to a further feature of the invention, a further step (or means) may be provided for determining whether the vehicle is in a turning operation, and the step for pushing the brake pad to the brake disc may be prohibited, when the vehicle is in the turning operation.

The vehicle behavior is likely to become unstable during the turning operation due to the braking forces. According to the above feature of the invention, however, the braking force for correcting the pad position is not applied to the vehicle during the vehicle turning operation. Accordingly, it is avoided that the vehicle behavior would become unstable.

BRIEF DESCRIPTION OF THE DRAWINGS

The above and other objects, features and advantages of the present invention will become more apparent from the following detailed description made with reference to the accompanying drawings. In the drawings:

FIGS. 3A to 3C are schematic views respectively showing positions of an inner pad, an outer pad (i.e. a movable caliper), and a brake disc of a disc brake device having the movable caliper, wherein FIG. 3A shows a restored condition, FIG. 3B shows a small pressure applied condition, and FIG. 3C shows a normal condition of the brake disc;

FIG. 11 is a time chart for explaining the process for determining the thermal inclination for the third embodiment shown in FIG. 10;

FIG. 13 is a time chart for explaining the process for determining the thermal inclination for the fourth embodiment shown in FIG. 12;

FIGS. 14A to 14C are schematic views respectively showing positions of an inner pad, an outer pad (i.e. a movable caliper), and a brake disc of a disc brake device having the movable caliper, wherein FIG. 14A shows normal condition, FIG. 14B shows a condition of a thermal inclination, and FIG. 14C shows a restored condition.

DETAILED DESCRIPTION OF THE PREFERRED EMBODIMENTS

First Embodiment

A disc brake control system for a vehicle according to embodiments of the present invention will be explained with reference to the drawings.

Figure 1:
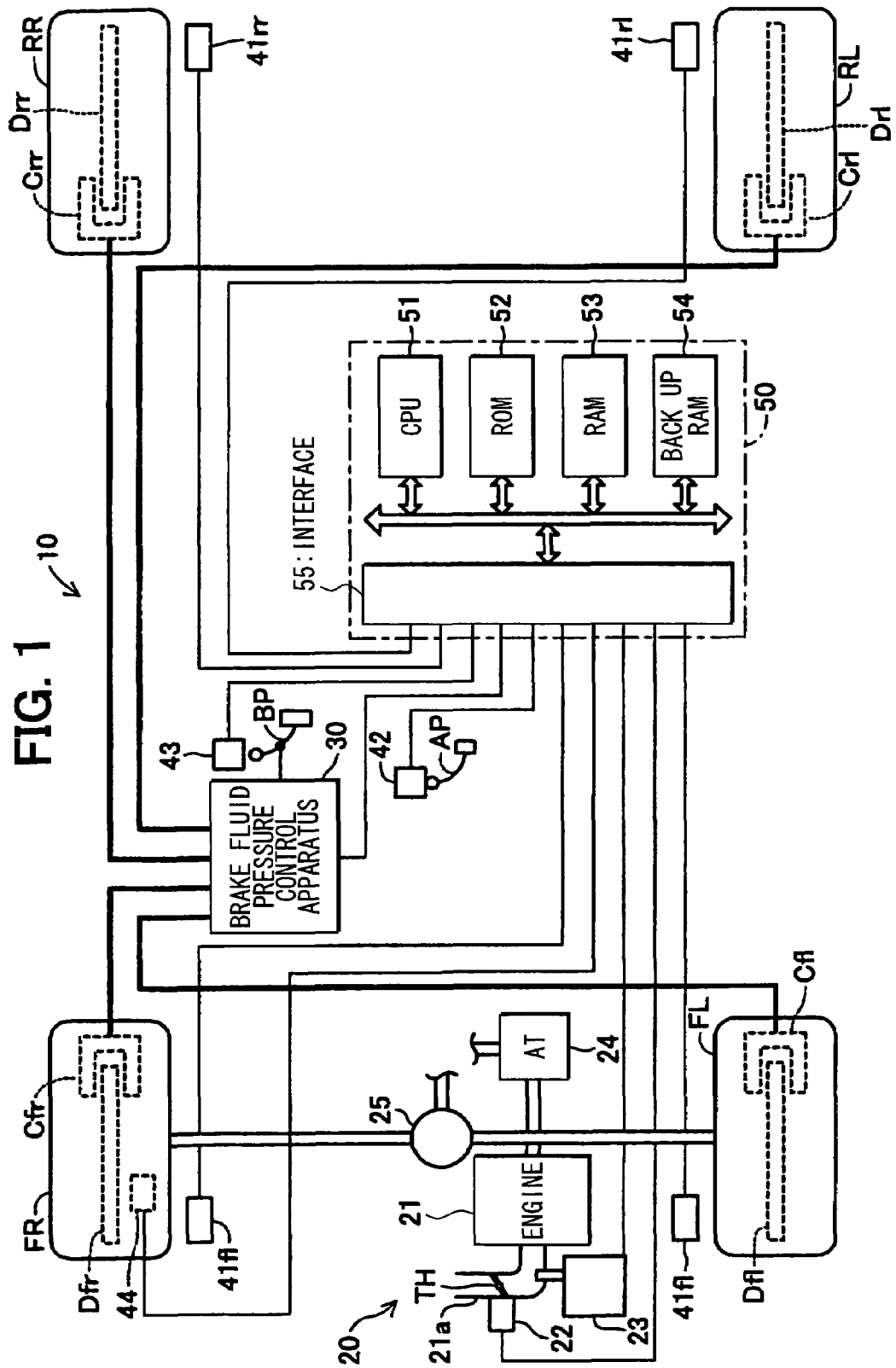
FIG. 1 is a schematic structural view showing a vehicle movement control system having a disc brake control system according to a first embodiment of the present invention.

FIG. 1 is a schematic structural view showing a vehicle movement control system having a disc brake control system according to a first embodiment of the present invention. The vehicle, to which the present invention is applied, is, for example, a vehicle of a front-wheel drive.

The vehicle movement control system 10 has a power transmitting mechanism 20, in which a vehicle driving power is produced and transmitted to respective driving wheels (a front-left wheel Fl, and a front-right wheel FR). The vehicle movement control system 10 further has a brake fluid pressure control apparatus 30 for applying brake fluid pressure to disc brake devices (i.e. to wheel cylinders thereof) for the respective wheels (FL, FR, RL, and RR). The vehicle movement control system 10 has various sensors 41 to 44 (described below) and an electronic control unit (ECU) 50.

The disc brake devices of the movable caliper type for the respective wheels (FL, FR, RL, and RR) has the same structure to that shown in FIGS. 14A to 14C and FIG. 15. The explanation for the detailed structure and operation thereof is, therefore, omitted.

The power transmitting mechanism 20 is composed of an internal combustion engine 21 for producing the vehicle driving force, an actuator 22 having a DC motor for adjusting an opening area of an air intake passage by controlling a position of a throttle valve TH provided in an air intake pipe 21a, a fuel injection apparatus 23 having an injector for injecting fuel into an intake port (not shown) of the engine 21, an automatic transmission device 24 an input shaft of which is connected to an output shaft of the engine 21, and a differential gear 25 for dividing the driving power transmitted from an output shaft of the automatic transmission device 24 and for respectively transmitting such divided driving power to the front wheels FL and FR.

Figure 2:
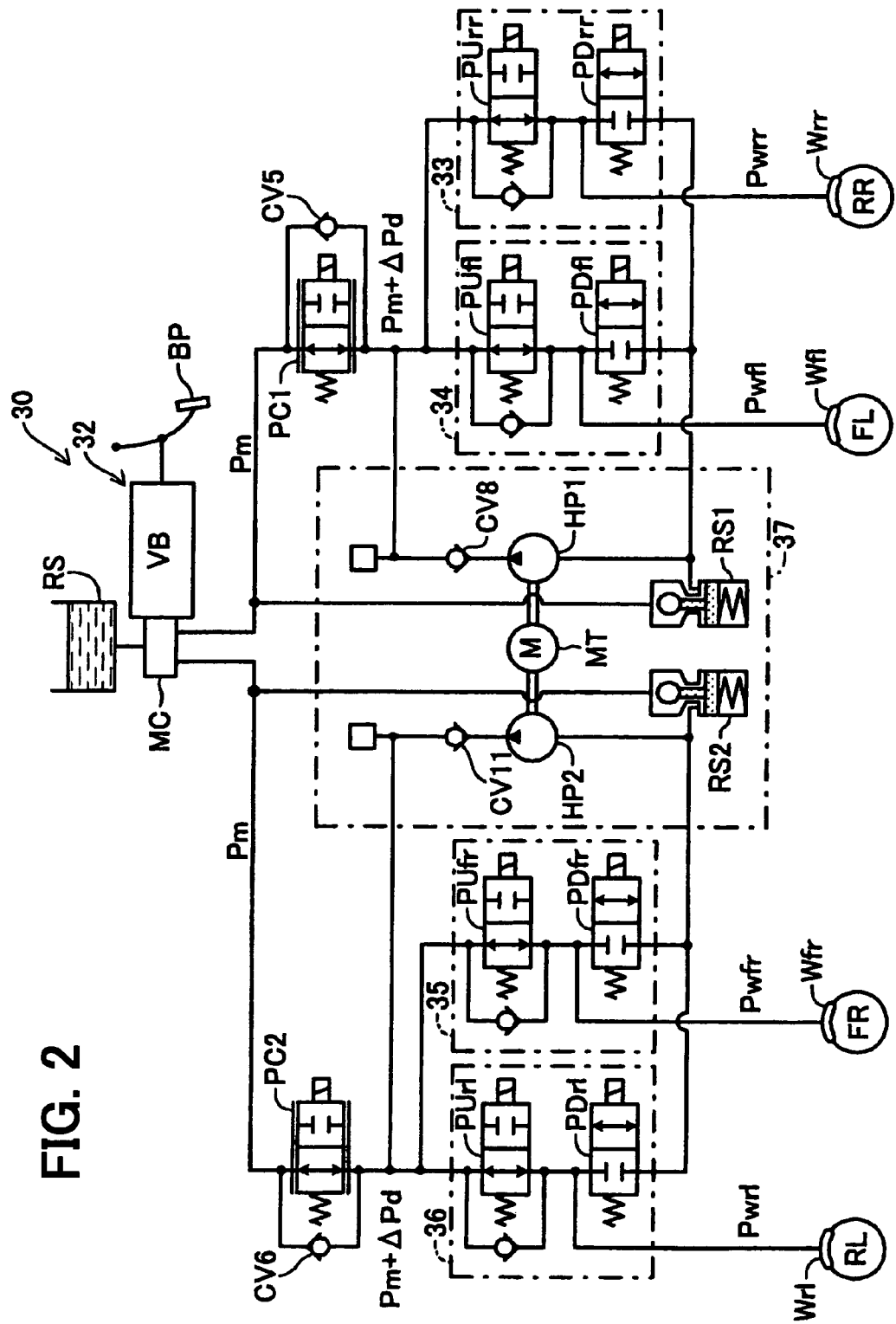
FIG. 2 is a schematic structural view showing a brake fluid pressure control apparatus shown in FIG. 1.

The brake fluid pressure control apparatus 30 has, as shown in FIG. 2, a brake fluid pressure generating portion 32 for generating the brake fluid pressure depending on an operational force for a brake pedal BP, brake fluid pressure adjusting portions 33, 34, 35 and 36 for respectively adjusting the brake fluid pressure to be applied to wheel cylinders (Wrr, Wfl, Wfr, Wrl) arranged at the respective wheels (RR, FL, FR, RL), and a brake fluid re-circulating portion 37.

The brake fluid pressure generating portion 32 has a vacuum booster VB operated by the operational force applied to the brake pedal BP, and a master cylinder MC connected to the vacuum booster VB.

Detailed explanation for the structure and operation of the master cylinder MC as well as the vacuum booster VB is omitted here, because they are known in the art. The brake fluid pressure generating portion 32 (the master cylinder MC and the vacuum booster VB) generates a first master cylinder pressure and a second master cylinder pressure in accordance with the operational force applied to the brake pedal BP.

A linear electromagnetic valve PC1 of a normally opened type is provided between a first port of the master cylinder MC and upstream sides of the brake fluid pressure adjusting portions 33 and 34 for the wheels RR and FL. In the same manner, a linear electromagnetic valve PC2 of a normally opened type is provided between a second port of the master cylinder MC and upstream sides of the brake fluid pressure adjusting portions 35 and 36 for the wheels FR and RL. Details of the electromagnetic valves PC1 and PC2 will be explained below.

The brake fluid pressure adjusting portion 33 for the wheel RR is composed of a pressure increasing valve PUrr and a pressure decreasing valve PDrr, wherein the pressure increasing valve PUrr is a normally opened type electromagnetic valve having two ports and two switching positions, whereas the pressure decreasing valve PDrr is a normally closed type electromagnetic valve having two ports and two switching positions. The brake fluid pressure in the wheel cylinder Wrr (i.e. wheel cylinder pressure Pwrr) is adjusted to be increased, to be held, or to be decreased by controlling the pressure increasing valve PUrr and the pressure decreasing valve PDrr.

In the same manner as above, each of the brake fluid pressure adjusting portion 34 for the wheel FL, the brake fluid pressure adjusting portion 35 for the wheel FR, and the brake fluid pressure adjusting portion 36 for the wheel RL, has a pressure increasing valve PUfl and a pressure decreasing valve PDfl, a pressure increasing valve PUfr and a pressure decreasing valve PDfr, and a pressure increasing valve PUrl and a pressure decreasing valve PDrl.

The brake fluid re-circulating portion 37 has a DC motor MT, and two liquid pumps (e.g. gear pumps) HP1 and HP2, which are simultaneously driven by the DC motor MT. The liquid pump HP1 sucks the brake fluid from a reservoir RS1, into which the brake fluid is circulated from the pressure decreasing valves PDrr and/or PDfl, in order to pressurize and supply the pressurized brake fluid to the upstream sides of the brake fluid pressure adjusting portions 33 and 34 (for the wheels RR and FL) through a check valve CV8.

In the similar manner, the liquid pump HP2 sucks the brake fluid from a reservoir RS2, into which the brake fluid is circulated from the pressure decreasing valves PDfr and/or PDrl, in order to pressurize and supply the pressurized brake fluid to the upstream sides of the brake fluid pressure adjusting portions 35 and 36 (for the wheels FR and RL) through a check valve CV11.

The linear electromagnetic valve PC1 of the normally opened type will be explained. A biasing force of a coil spring (not shown) is always applied to a valve body of the linear electromagnetic valve PC1 in a valve opening direction. In addition, a fluid pressure, which is a differential pressure between the first master cylinder pressure Pm and the fluid pressure at the upstream sides of the brake fluid pressure adjusting portions 33 and 34 (for the wheels RR and FL), is applied to the valve body of the linear electromagnetic valve PC1 in the valve opening direction. The above differential pressure is also referred to as an actual differential pressure, which is obtained by subtracting the first master cylinder pressure Pm from the fluid pressure at the upstream sides of the brake fluid pressure adjusting portions 33 and 34. Furthermore, an electromagnetic force in proportion to electric current supplied to the linear electromagnetic valve PC1 is applied to the valve body thereof PC1 in the valve closing direction.

Namely, a differential pressure corresponding to the above electromagnetic force, which is a differential value between the electromagnetic force in the valve closing direction and the spring force in the valve opening direction (an which is also referred to as a command differential pressure ΔPd), is so designed that the command differential pressure ΔPd is increased in proportion to the increase of the electric current to the linear electromagnetic valve PC1. As a result, the linear electromagnetic valve PC1 is closed, so that the fluid communication between the first port of the master cylinder MC and the upstream sides of the brake fluid pressure adjusting portions 33 and 34 is cut off, when the command differential pressure ΔPd becomes larger than the actual differential pressure.

On the other hand, the linear electromagnetic valve PC1 is opened when the command differential pressure ΔPd becomes smaller than the actual differential pressure, so that the first port of the master cylinder MC is communicated with the upstream sides of the brake fluid pressure adjusting portions 33 and 34. As a result, the brake fluid at the upstream sides of the brake fluid pressure adjusting portions 33 and 34, to which the brake fluid is supplied from the liquid pump HP1, flows toward the first port of the master cylinder MC through the linear electromagnetic valve PC1, in order that the actual differential pressure is adjusted to coincide with the command differential pressure ΔPd. The brake fluid flowing toward the first port of the master cylinder MC is re-circulated to the reservoir RS1.

In other words, the above actual differential pressure (more exactly, its maximum allowable value) is controlled in accordance with the electric current supplied to the linear electromagnetic valve PC1, when the motor MT is operated to drive the liquid pumps HP1 and HP2. In this situation, the fluid pressure at the upstream sides of the brake fluid pressure adjusting portions 33 and 34 becomes a value of "Pm+ΔPd", wherein the actual differential pressure (=the command differential pressure ΔPd) is added to the first master cylinder pressure Pm.

When the linear electromagnetic valve PC1 is deactivated (i.e. when the electric current is made zero "0"), the valve opening condition of the linear electromagnetic valve PC1 is maintained by the biasing force of the coil spring thereof. Then, the fluid pressure at the upstream sides of the brake fluid pressure adjusting portions 33 and 34 becomes equal to the first master cylinder pressure Pm, so that the actual differential pressure becomes zero.

A structure and an operation of a linear electromagnetic valve PC2 of a normally opened type are identical to those of the linear electromagnetic valve PC1. Accordingly, a fluid pressure at the upstream sides of the brake fluid pressure adjusting portions 35 and 36 becomes a value of "Pm+ΔPd", in accordance with the electric current supplied to the linear electromagnetic valve PC2, when the motor MT is operated to drive the liquid pumps HP1 and HP2. In the above operation, the command differential pressure ΔPd is added to a second master cylinder pressure Pm. On the other hand, when the linear electromagnetic valve PC2 is deactivated, the fluid pressure at the upstream sides of the brake fluid pressure adjusting portions 35 and 36 becomes equal to the second master cylinder pressure Pm.

A check valve CV5 is provided in parallel to the linear electromagnetic valve PC1, for allowing the brake fluid to flow only from the first port of the master cylinder MC to the upstream sides of the brake fluid pressure adjusting portions 33 and 34. Due to the check valve CV5, the brake fluid pressure itself (i.e. the first master cylinder pressure Pm) can be applied to the wheel cylinders Wrr and Wfl depending on the operational force applied to the brake pedal BP, when the first master cylinder pressure Pm becomes higher than the fluid pressure at the upstream sides of the brake fluid pressure adjusting portions 33 and 34 as a result of the operation of the brake pedal BP. This can be done even during a period, in which the actual differential pressure is controlled in accordance with the electric current supplied to the linear electromagnetic valve PC1.

A check valve CV6, which performs the same function to the check valve CV5, is also provided in parallel to the linear electromagnetic valve PC2.

As above, the brake fluid pressure control apparatus 30 has two hydraulic systems, one of which is the hydraulic system for the rear right wheel RR and the front left wheel FL, and the other of which is the hydraulic system for the rear left wheel RL and the front right wheel FR. When all of the electromagnetic valves are deactivated (i.e. when the current supply is zero), the brake fluid pressure depending on the operational force applied to the brake pedal BP (i.e. the master cylinder pressure Pm) is applied to the respective wheel cylinders (Wrr, Wfl, Wfr, Wrl).

On the other hand, the brake fluid pressure, which is higher than the master cylinder pressure Pm by the command differential pressure ΔPd determined by the current supply, is applied to the respective wheel cylinders (Wrr, Wfl, Wfr, Wrl), when the linear electromagnetic valves PC1 and PC2 are activated (i.e. when the current supply is not zero), and the motor MT is operated to drive the liquid pumps HP1 and HP2.

Furthermore, according to the brake fluid pressure control apparatus 30, respective wheel cylinder pressures (Pwrr, Pwfl, Pwfr, Pwrl) can be independently adjusted by respectively controlling the pressure increasing valves (PUrr, PUfl, PUfr, PUrl) and and the pressure decreasing valves (PDrr, PDfl, PDfr, PDrl). Namely, the brake fluid pressure control apparatus 30 can adjust the braking force applied to the respective wheels, independently from the operation of the brake pedal BP by a vehicle driver.

Furthermore, the brake fluid pressure control apparatus 30 of the above structure can provide a braking force for correcting a pad position by command signals from the ECU 50, during a period in which the brake pedal BP is not operated by the vehicle driver, as described below.

Referring back to FIG. 1, reference numerals 41*rr*, 41*fl*, 41*fr*, 41*rl* designate wheel speed sensors of an electromagnetic pick-up type, each of which outputs a signal having a frequency corresponding to a wheel speed of the respective wheels (RR, FL, FR, RL). The wheel speed sensors are collectively referred to as a wheel speed sensor 41 or wheel speed sensors 41. A reference numeral 42 designates an acceleration pedal sensor for detecting an operational stroke Accp of an acceleration pedal AP by the vehicle driver and for outputting a signal indicating the operational stroke Accp of the acceleration pedal AP. A reference numeral 43 designates a brake pedal sensor for detecting an operational force Fp of the brake pedal BP by the vehicle driver and for outputting a signal indicating the operational force Fp of the brake pedal BP. A reference numeral 44 designates a temperature sensor for detecting a temperature of the brake disc Dfr, which represents a temperature of the brake discs (Drr, Dfl, Dfr, Drl) for the wheels (RR, FL, FR, RL), and for outputting a brake disc temperature T.

The ECU 50 is a micro-computer comprising; CPU 51; ROM 52 for storing programs, tables (a look-up table, a map), constant numbers and so on, according to which the CPU 51 carries out various processes; RAM 53 for temporally storing data according to the necessity; a backup RAM 54 for storing the data when an electric power is supplied and for holding the data even after the electric power is cut off; an interface circuit 55 having AD converters, and so on, wherein the above components are connected with each other via bus lines. The interface circuit 55 is connected to the sensors 41, 42, 43, and 44, for transmitting the signals from the sensors 41 to 44 to the CPU 51, and for sending command signals (driving signals) to the respective electromagnetic valves and the motor MT of the brake fluid pressure control apparatus 30, the actuator 22, and the fuel injection apparatus 23, in accordance with the command of the CPU 51.

The actuator 22 drives the throttle valve TH, so that the opening position of the throttle valve TH corresponds to the operational stroke Accp of the acceleration pedal AP. The fuel injection apparatus 23 injects a necessary amount of fuel, in order to obtain a target air-fuel ratio (e.g. the stoichiometric air-fuel ratio) for the intake air of a cylinder, which is the air sucked into the cylinder.

(An Operation for the Braking Force for Correcting the Pad Position)

An operation for applying the braking force (for the purpose of correcting the pad position) to the brake disc device of the vehicle movement control system will be explained.

As already described above, in the brake disc device of the movable caliper type shown in FIGS. 14A to 14C and FIG. 15, the thermal inclination may occur at the brake disc D, when the temperature of the brake disc D is extremely increased as a result of the frequent braking operation. In the thermal inclination, the sliding surface of the brake disc D is inclined. On the other hand, the brake disc D is restored from the thermal inclination to the normal condition, when the temperature of the brake disc D is decreased due to the travel wind and so on. Namely, the brake disc D returns to its normal shape.

The inclination of the sliding surface of the brake disc D becomes larger, as the temperature of the brake disc D is increased to the higher value. According to the present invention, a temperature of the brake disc D, at which the inclination of the sliding surface of the brake disc D becomes to a first predetermined angle, is referred to as a first preset temperature T1. In a similar manner, a temperature of the brake disc D, at which the inclination of the sliding surface of the brake disc D becomes to a second predetermined angle smaller than the first predetermined angle, is referred to as a second preset temperature T2, which is lower than T1. According to the present invention, therefore, the ECU 50 determines that the thermal inclination has occurred, when the brake disc temperature T obtained from the temperature sensor 44 exceeds the first preset temperature T1. On the other hand, the ECU 50 determines that the brake disc has been restored from the thermal inclination to its restored condition, when the temperature T of the brake disc (which had been in the condition of the thermal inclination) becomes lower than the second preset temperature T2.

Figure 3A:
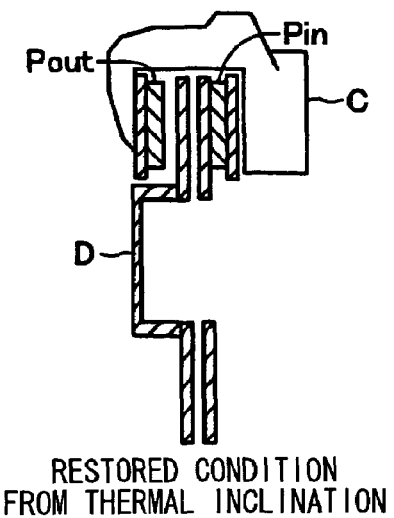

FIG. 3A shows the positions of the inner pad Pin, the outer pad Pout (i.e. the movable caliper C), and the brake disc D in the restored condition, when the ECU 50 determines that the brake disc D has been restored from the thermal inclination to its restored condition, wherein the applied brake fluid pressure is released from the wheel cylinder.

Figure 14A:
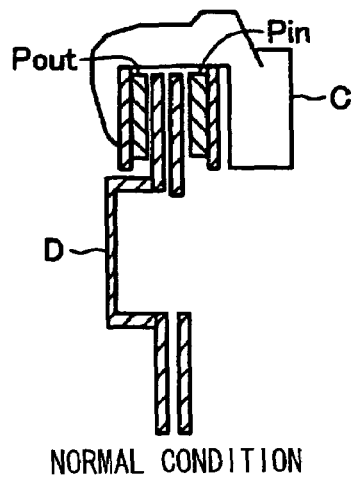
Figure 14B:
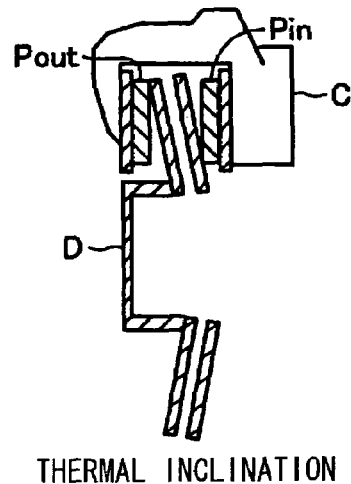
Figure 14C:
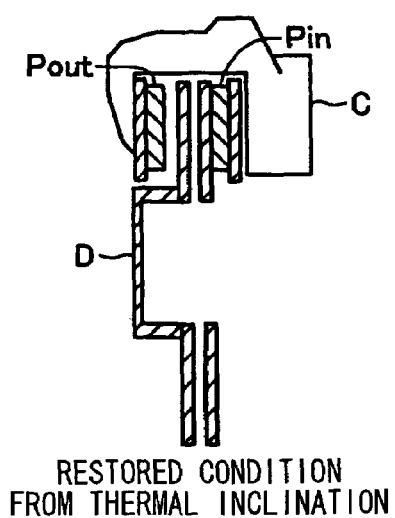

As in the similar manner to that in FIG. 14C, a space is formed between the outer pad Pout and the outside sliding surface of the brake disc D in the restored condition of the brake disc, as shown in FIG. 3A. Therefore, the brake drag between the outer pad Pout and the sliding surface of the brake disc D may not be easily generated, whereas the brake drag between the inner pad Pin and the sliding surface of the brake disc is likely to occur.

According to the present invention, therefore, a small brake fluid pressure is applied to all of the wheel cylinders (Wrr, Wfl, Wfr, Wrl) for a predetermined time period (e.g. one second), in order to suppress the generation of the brake drag between the inner pad Pin and the sliding surface of the brake disc. This is carried out by the operation of the brake fluid pressure control apparatus 30, at a predetermined timing after the ECU 50 determines that the brake disc D has been restored from the thermal inclination to its restored condition.

An explanation for the predetermined timing will be made below with reference to the flowchart. The above small brake fluid pressure is such a small value, at which the brake pads (the inner pad Pin and the outer pad Pout) can be moved so that the brake pads are brought into contact with the sliding surfaces of the brake disc D.

Figure 3B:
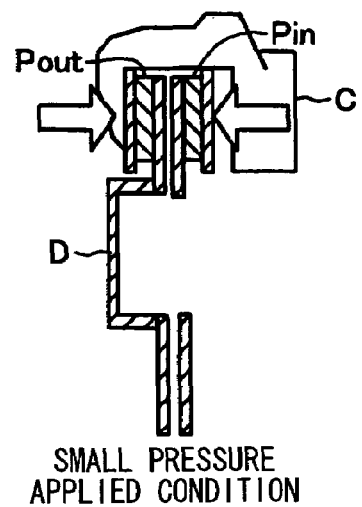

As shown in FIG. 3B, the piston Pis (i.e. the inner pad Pin) and the movable caliper (i.e. the outer pad Pout) are respectively moved toward the brake disc D with a force corresponding to the above small brake fluid pressure. As a result, the inner pad Pin and the outer pad Pout are respectively pushed against the inside and outside sliding surfaces of the brake disc D, which has been already restored to its normal shape, by the force corresponding to the above small brake fluid pressure. Namely, the braking force for correcting the pad position, which corresponds to the small brake fluid pressure, is applied to all of the vehicle wheels.

Figure 3C:
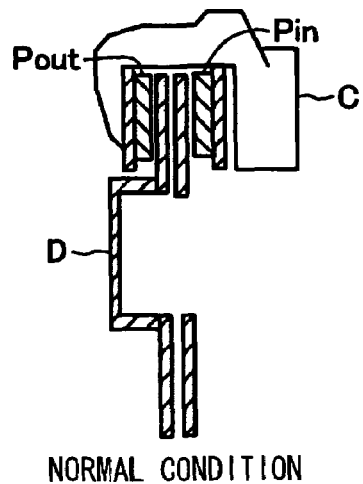

FIG. 3C shows the positions of the inner pad Pin, the outer pad Pout (i.e. the movable caliper C), and the brake disc D in the restored condition, after the braking force for correcting the pad position has been released from the vehicle wheels (namely, after the small brake fluid pressure is released from the wheel cylinders). As shown in FIG. 3C, the positions of the inner pad Pin and the outer pad Pout relative to the brake disc D are in the normal condition, as in the same manner to FIG. 14A.

Namely, spaces are respectively formed between the inner pad Pin and the inside sliding surface of the brake disc D, and between the outer pad Pout and the outside sliding surface of the brake disc D. Accordingly, the brake drag of the inner pad Pin is suppressed in the restored condition from the thermal inclination.

According to the disc brake control system of the invention, the small brake fluid pressure is applied to all of the wheel cylinders (Wrr, Wfl, Wfr, Wrl) for the predetermined time period (e.g. one second) and at the predetermined timing, independently from the pedal operation of the vehicle driver and after the ECU 50 determines that the brake disc D has been restored from the thermal inclination to its restored condition. As above, the brake drag of the inner pad Pin is suppressed in the restored condition from the thermal inclination.

A more detailed operation will be explained with reference to the flowcharts shown in FIGS. 4 and 6, each step of which is carried out by the ECU 50 (i.e. the CPU 51). In the flowcharts, a flag "LEAN" indicates that the brake disc D is in the condition of the thermal inclination, when the value of the flag "LEAN" is "1". On the other hand, the flag "LEAN" indicates that the brake disc D is not in the condition of the thermal inclination, when the value of the flag "LEAN" is "0". A flag "RET" indicates that the brake disc D is in the restored condition from the thermal inclination, when the value of the flag "RET" is "1", whereas the flag "RET" indicates that the brake disc D is not in the restored condition from the thermal inclination, when the value of the flag "RET" is "0".

Figure 4:
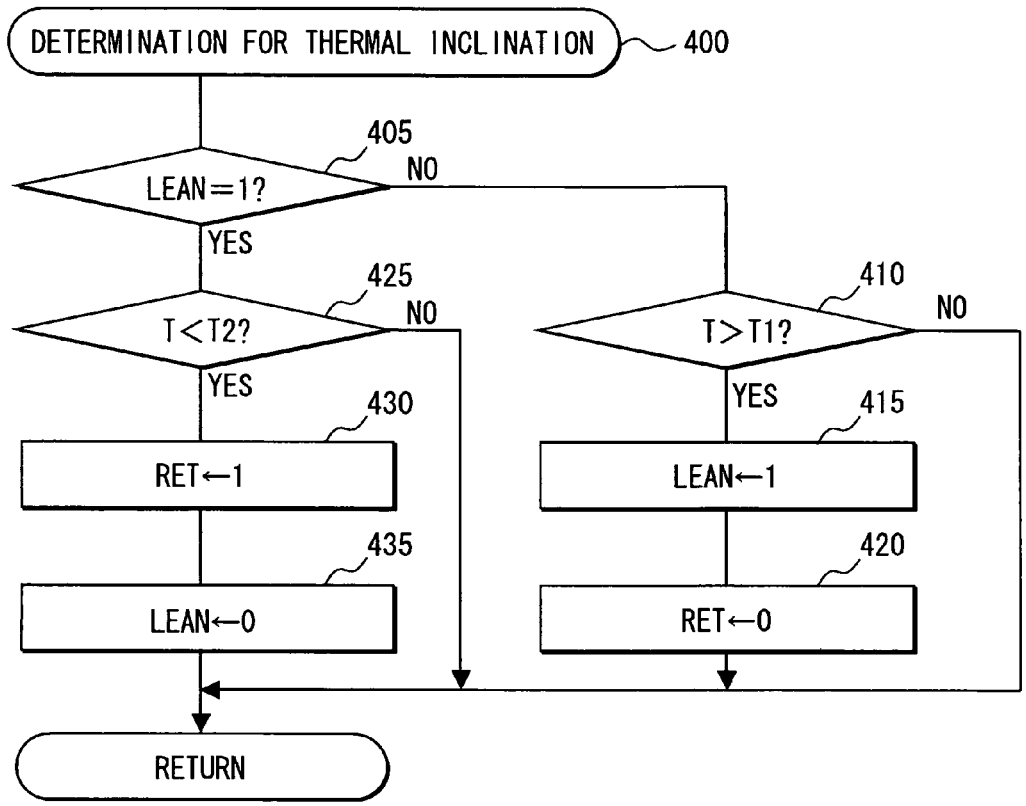
FIG. 4 is a flow chart showing a process to be carried out by CPU shown in FIG. 1, for determining a thermal inclination.

The CPU 51 repeatedly carries out a routine shown in FIG. 4 for determining the thermal inclination at a predetermined time interval (for example, the time interval Δt is 6 msec). The CPU 51 starts a step 400 at a certain timing, and goes to a step 405 for determining whether the value of the flag "LEAN" is "1".

Figure 5:
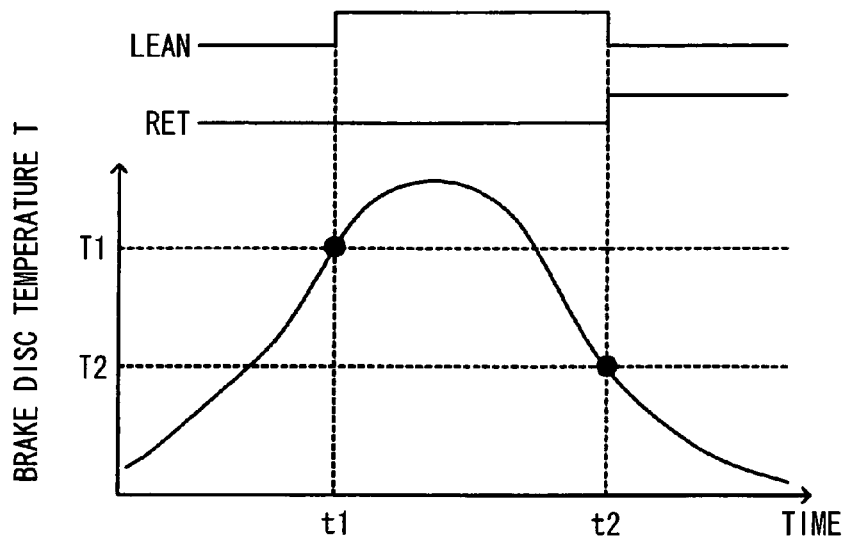
FIG. 5 is a time chart showing a temperature change of the brake disc and a change of flags.

The explanation will be made under the assumption that the brake disc temperature T obtained from the temperature sensor 44 is lower than the second preset temperature T2, and the values of the flag "LEAN" and the flag "RET" are respectively at their initial values of "0", as shown in FIG. 5, before reaching a time point t1.

In this situation, the CPU 51 determines "NO" at the step 405, and the process goes to a step 410 at which the CPU 51 monitors whether the brake disc temperature T exceeds the first preset temperature T1. At this moment, the brake disc temperature T is lower than the first preset temperature T1. Accordingly, the CPU 51 determines "NO" at the step 410, so that the process goes to a step 495 and the routine of FIG. 4 is temporally terminated. This operation is repeated until the brake disc temperature T exceeds the first preset temperature T1.

Then, an explanation is made for a case, in which the brake disc temperature T is increased to exceed the first preset temperature T1, at a time point t1 as shown in FIG. 5, as a result of the frequent braking operations by the vehicle driver. Namely, in this case, the brake disc is in the condition of the thermal inclination.

In this case, when the process goes to the step 410, the CPU 51 determines "YES" so that the process goes to a step 415. The CPU 51 changes the value of the flag "LEAN" from "0" to "1" at the step 415, and sets the value of the flag "RET" at the value of "0" at a step 420.

Accordingly, when the process goes to the step 405, the CPU 51 determines "YES" because the value of the flag "LEAN" has been changed from "0" to "1", and the process further goes to a step 425. The CPU 51 monitors at the step 425 whether the brake disc temperature T is becomes lower than the second preset temperature T2. At this stage, the brake disc temperature T is higher than the second preset temperature T2, because it is the timing just after the brake disc temperature T has exceeded the first preset temperature T1.

Accordingly, the CPU 51 determines "NO" at the step 425, and the process goes to the step 495, so that the routine of FIG. 4 is temporally terminated. This operation is repeated until the brake disc temperature T becomes lower than the second preset temperature T2.

A further explanation is made for a case, in which the brake disc temperature T is decreased to become lower than the second preset temperature T2, at a time point t2 as shown in FIG. 5, as a result of the travel wind and so on. Namely, in this case, the brake disc is in the restored condition from the thermal inclination.

In this case, when the process goes to the step 425, the CPU 51 determines "YES" so that the process goes to a step 430. The CPU 51 changes the value of the flag "RET" from "0" to "1" at the step 430, and also changes the value of the flag "LEAN" from "1" to "0" at the following step 435.

Accordingly, when the process goes to the step 405, the CPU 51 determines "NO" again because the value of the flag "LEAN" has been changed from "1" to "0", and the process goes to the step 410 so that the CPU 51 monitors again whether the brake disc temperature T exceeds the first preset temperature T1.

As above, the above routine of FIG. 4 is repeated, so that the values of the flag "LEAN" and the flag "RET" are respectively changed to "1" and "0", whenever the brake disc temperature T is increased to exceed the first preset temperature T1 (i.e. when the brake disc is in the thermal inclination). On the other hand, the values of the flag "LEAN" and the flag "RET" are respectively changed to "0" and "1", whenever the brake disc temperature T is decreased to become lower than the second preset temperature T2 (i.e. when the brake disc is in the restored condition from the thermal inclination).

Figure 6:
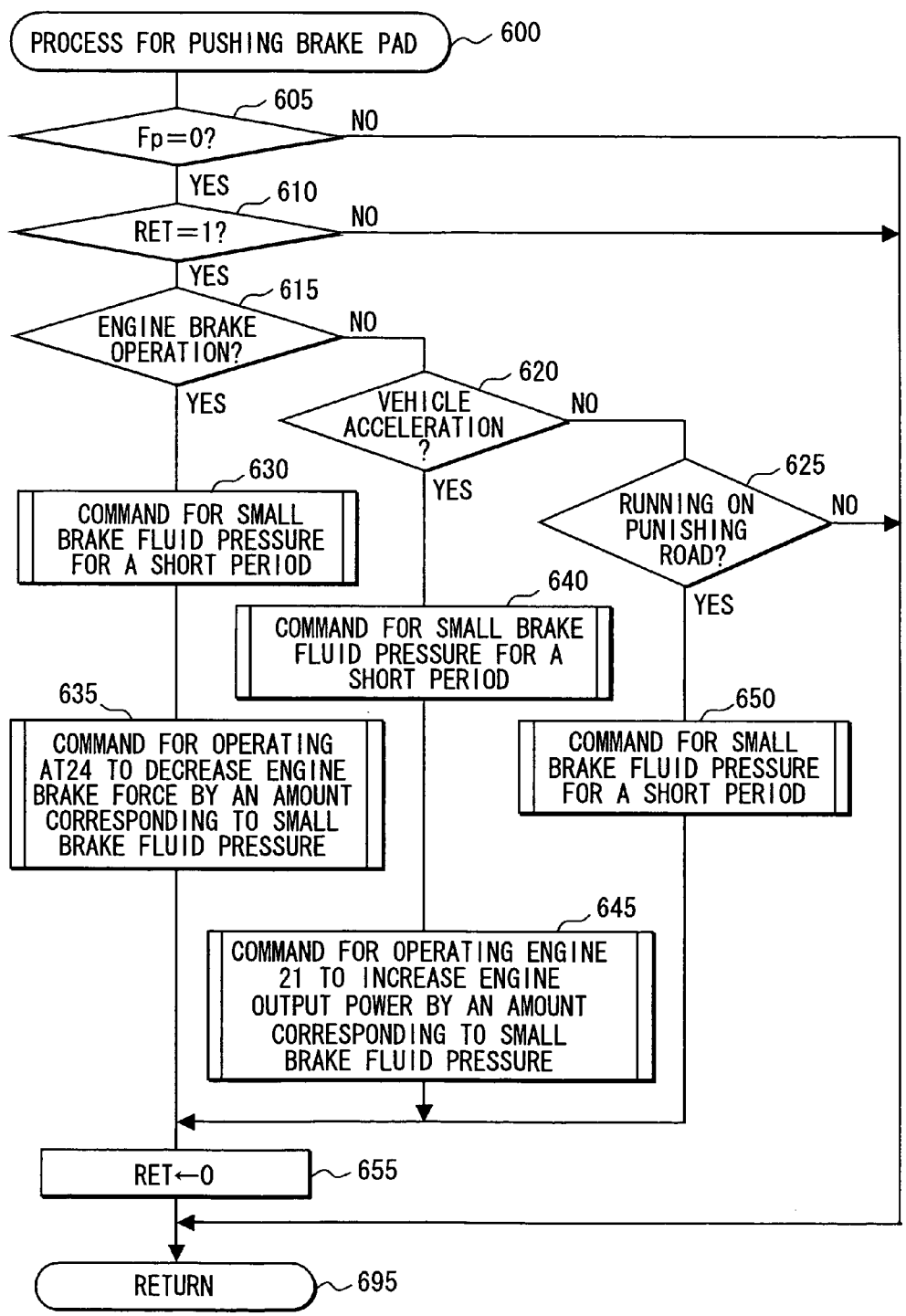
FIG. 6 is a flow chart showing a process to be carried out by CPU shown in FIG. 1, for performing the process for pushing the brake pad.

In addition to the routine of FIG. 4, the CPU 51 repeatedly carries out a routine shown in FIG. 6 for pushing the brake pads to the brake disc at a predetermined time interval (for example, the time interval Δt is 6 msec).

The CPU 51 starts a step 600 at a certain timing, and goes to a step 605 for determining whether the value of the operational force Fp of the brake pedal BP obtained from the brake pedal sensor 43 is zero (Fp=0 means a condition in which the brake pedal is not operated). When the CPU 51 determines "NO", the process goes to a step 695 so that the routine of FIG. 6 is temporally terminated.

In the case that the brake pedal is not operated (Fp=0), and the brake disc is in the restored condition from the thermal inclination (LEAN=0, RET=1), namely when the brake drag is generated at the inner pad Pin, the CPU 51 determines "YES" at the step 605, and the process goes to a step 610. The CPU 51 determines whether the value of the flag "RET" is "1", and the process goes to the step 695 in case of the determination of "NO", to temporally terminate the routine of FIG. 6.

The CPU 51 determines "YES" at the step 610, because the value of the flag "RET" is "1" when the brake drag is generated at the inner pad Pin. Then, the process goes to a step 615, at which the CPU 51 determines whether an engine braking force is applied to the vehicle. Whether the engine braking force is applied to the vehicle or not can be detected by the signal from the acceleration pedal sensor 42 indicating the operational stroke Accp of the acceleration pedal AP. Namely, when the signal for the operational stroke Accp is changed from any other values than zero to the value of "0", the CPU 51 determines that the engine braking force is applied to the vehicle.

In case of the determination "NO" at the step 615, the process goes to a step 620, at which the CPU 51 determines whether the vehicle is in a condition of acceleration. Whether the vehicle is in the accelerating condition or not can be detected by a changing speed "dAccp/dt" for the operational stroke Accp of the acceleration pedal AP, which is obtained from the acceleration pedal sensor 42. Namely, in the case that the value of "dAccp/dt" is larger than a predetermined value higher than "0", the CPU 51 determines that the vehicle is in the accelerating condition.

In case of the determination "NO" at the step 620, the process goes to a step 625, at which the CPU 51 determines whether the vehicle is running on the punishing road. Whether the vehicle is running on the punishing road or not can be detected by a changing speed "dVw/dt" for the vehicle wheel speed Vw, which is obtained from the wheel speed sensor 41. Namely, when a number of cases, in which the value of "dVw/dt" becomes larger than a predetermined value higher than "0", is larger than a predetermined number, the CPU 51 determines that the vehicle is running on the punishing road.

When the CPU 51 determines "NO" at the step 625, the process goes to the step 695 to temporally terminate the routine of FIG. 6. As above, the operation for applying the braking force for correcting the pad position (i.e. the operation for pushing the brake pads to the brake disc) is not carried out, when the vehicle is not in any of the conditions of "the engine braking operation", "the accelerating operation" and "the running operation on the punishing road", although the brake pedal is not operated and the brake disc is in the restored condition from the thermal inclination.

Next, an explanation will be further made for a case, in which the brake pedal is not operated and the brake disc is in the restored condition from the thermal inclination (RET="1"), and in which the CPU 51 determines the condition of the engine braking operation. In such a case, the CPU 51 determines "YES" at the step 615, and the process goes to a further step 630. At the step 630, the CPU 51 outputs command signals to the electromagnetic valves (the electromagnetic valves of the normally opened type) PC1, PC2, to the motor MT, and so on, in order that the small brake fluid pressure is applied to all of the wheel cylinders (Wrr, Wfl, Wfr, Wrl) for the predetermined time period.

In addition, the process goes to a step 635, at which the CPU 51 outputs command signals to the automatic transmission device 24 and so on, so that the braking force applied from the engine 21 to the vehicle wheels is decreased by such an amount of the braking force generated by the small brake fluid pressure (i.e. the braking force for correcting the pad position) for such predetermined time period during which the small brake fluid pressure is applied to the wheel cylinders. A method for adjusting the braking force of the engine to be transmitted to the vehicle wheels by use of the automatic transmission device 24 is known in the art. A detailed explanation thereof is omitted.

The process further goes on to a step 655, at which the CPU 51 changes the value of the flag "RET" from "1" to "0". Then, the process goes to the step 695 to temporally terminate the routine of FIG. 6. When the process goes to the step 610 thereafter, the CPU 51 determines "NO" so that the process directly goes to the step 695.

As understood from the above explanation, the small brake fluid pressure is applied by the command signals at the step 630 to all of the wheel cylinders (Wrr, Wfl, Wfr, Wrl), namely the braking force for correcting the pad position is applied, for the predetermined time period. Accordingly, when the braking force for correcting the pad position is released after the predetermined time period, the positions of the inner pad Pin as well as the outer pad Pout relative to the brake disc D become to the normal positions, as shown in FIG. 3C. As a result, the brake drag of the inner pad Pin, which is otherwise generated in the restored condition from the thermal inclination, can be suppressed.

Furthermore, the total braking force applied to the vehicle during the above predetermined time period can be controlled by the command signals at the step 635 at such a value, which corresponds to the braking force applied to the vehicle by the engine braking operation alone. Accordingly, an uncomfortable feeling, which the vehicle driver would otherwise receive from the braking force for correcting the pad position, can be minimized.

Next, an explanation will be further made for a case, in which the brake pedal is not operated and the brake disc is in the restored condition from the thermal inclination (RET="1"), and in which the CPU 51 determines the condition of the vehicle acceleration. In such a case, the CPU 51 determines "YES" at the step 620, and the process goes to a further step 640. At the step 640, in the same manner to the step 630, the CPU 51 outputs the command signals to the electromagnetic valves (the electromagnetic valves of the normally opened type) PC1, PC2, to the motor MT, and so on, in order that the small brake fluid pressure is applied to all of the wheel cylinders (Wrr, Wfl, Wfr, Wrl) for the predetermined time period.

In addition, the process goes to a step 645, at which the CPU 51 outputs a command signal to the engine 21, so that the output power of the engine 21 is increased by such an amount corresponding to the braking force generated by the small brake fluid pressure (i.e. the braking force for correcting the pad position) for such predetermined time period during which the small brake fluid pressure is applied to the wheel cylinders. In this operation, the amount of the fuel injection is increased for the predetermined time period, wherein the increased fuel injection amount corresponds to the braking force for correcting the pad position.

Then, the process goes to the step 655, at which the CPU 51 changes the value of the flag "RET" from "1" to "0", and further goes to the step 695 to temporally terminate the routine of FIG. 6.

As above, in the same manner to the case in which the engine braking operation is performed, the small brake fluid pressure is applied to all of the wheel cylinders (Wrr, Wfl, Wfr, Wrl) for the predetermined time period. As a result, the brake drag of the inner pad Pin, which is otherwise generated in the restored condition from the thermal inclination, can be suppressed.

Furthermore, the substantial amount of the vehicle driving force applied to the vehicle during the above predetermined time period can be controlled by the command signals at the step 645 at such a value, which corresponds to the vehicle driving force obtained by the engine operation by itself. Accordingly, any uncomfortable feeling, which the vehicle driver would otherwise receive from the braking force for correcting the pad position, can be minimized.

Next, an explanation will be further made for a case, in which the brake pedal is not operated and the brake disc is in the restored condition from the thermal inclination (RET="1"), and in which the CPU 51 determines that the vehicle is running on the punishing road. In such a case, the CPU 51 determines "YES" at the step 625, and the process goes to a further step 650. At the step 650, in the same manner to the step 630, the CPU 51 outputs the command signals to the electromagnetic valves (the electromagnetic valves of the normally opened type) PC1, PC2, to the motor MT, and so on, in order that the small brake fluid pressure is applied to all of the wheel cylinders (Wrr, Wfl, Wfr, Wrl) for the predetermined time period.

Then, the process likewise goes to the step 655, at which the CPU 51 changes the value of the flag "RET" from "1" to "0", and further goes to the step 695 to temporally terminate the routine of FIG. 6.

As above, in the same manner to the case in which the engine braking operation is performed, the small brake fluid pressure is applied to all of the wheel cylinders (Wrr, Wfl, Wfr, Wrl) for the predetermined time period. As a result, the brake drag of the inner pad Pin, which is otherwise generated in the restored condition from the thermal inclination, can be suppressed.

As above, the small brake fluid pressure is applied to the wheel cylinders, only when the brake pedal is not operated (Fp=0), the brake disc is in the restored condition from the thermal inclination (RET="1"), and the vehicle is in either one of the operating conditions among "the engine braking operation", "the accelerating operation" and "the running operation on the punishing road".

Any one of the above operating conditions among "the engine braking operation", "the accelerating operation", and "the running operation on the punishing road" corresponds to a vehicle operating condition, in which either the acceleration or the deceleration of the vehicle is changed. This operating condition further corresponds to such a vehicle operating condition, in which the vehicle driver can not easily feel or sense the braking force for correcting the pad position. Accordingly, any uncomfortable feeling, which the vehicle driver would otherwise receive from the braking force for correcting the pad position, can be minimized.

As explained above, in the disc brake control system according to the embodiment of the present invention, the small brake fluid pressure is applied to the wheel cylinders for the predetermined time period (e.g. 1 sec), at a certain timing after the CPU determines that the brake disc has been restored from the thermal inclination, and independently from the pedal operation by the vehicle driver.

Due to the above operation, the inner pad Pin and the outer pad Pout are restored to the normal positions with respect to the brake disc D, after the small brake fluid pressure is released. Therefore, the brake drag of the inner pad Pin, which is otherwise generated in the restored condition from the thermal inclination, can be suppressed. As a result, the unfavorable abrasion of the inner pad Pin as well as the brake disc D is suppressed, and in addition, the fade for the inner pad Pin is suppressed.

The present invention is not limited to the above embodiment, but many other modifications can be made without departing from the spirit of the invention. For example, in the above embodiment, the temperature of the brake disc Dfr of the front right wheel FR is used as representing the temperature of the whole brake discs (Drr, Dfl, Dfr, Drl) for the whole wheels (RR, FL, FR, RL), and used as the brake disc temperature T in the routine of FIG. 4 for determining the thermal inclination. However, the temperatures of more than two brake discs may be used as the brake disc temperature T in the process for determining the thermal inclination.

In such a case, an average value of the temperatures of multiple (two) brake discs, for example, for the front two wheels, the rear two wheels, the right two wheels, and the left two wheels, may be used as the brake disc temperature T. In such a case, multiple temperature sensors become necessary for detecting the respective temperatures of the brake discs.

In the above embodiment, the small brake fluid pressure having the same pressure is applied to all of the wheel cylinders (Wrr, Wfl, Wfr, Wrl). However, the brake fluid pressure for the two front wheel cylinders may be changed from that for the two rear wheel cylinders, wherein the distribution of the brake fluid pressures for the front and rear wheel cylinders may be equal to the distribution of the braking forces for the front and rear vehicle wheels.

In the above embodiment, the small brake fluid pressure may not be applied, when the vehicle is turning. By such a modification, it is avoided that the vehicle behavior will become unstable during the turning movement of the vehicle. The turning condition of the vehicle can be detected by a well known manner, for example, based on information from a yaw rate sensor, an angle sensor for a steering wheel, a navigation system, and so on.

In the above embodiment, the small brake fluid pressure is applied once (the steps 655, 610), whenever there stored condition from the thermal inclination (RET="1") is detected. However, the small brake fluid pressure may be applied to the wheel cylinders, whenever any one of the operating conditions among "the engine braking operation", "the accelerating operation" and "the running operation on the punishing road" is detected during a period from a timing of the determination of the restored condition (RET="1") to a timing of the determination of the thermal inclination (LEAN="1"). In this modification, the step 655 may be removed from the routine in FIG. 6.

In the above embodiment, the small brake fluid pressure is applied to the wheel cylinders, only when one of the operating conditions among "the engine braking operation", "the accelerating operation" and "the running operation on the punishing road" is detected after the determination of the restored condition from the thermal inclination (RET="1"). However, the small brake fluid pressure may be applied to the wheel cylinders, immediately after the determination of the restored condition from the thermal inclination (RET="1").

In the above embodiment, the present invention is applied to the disc brake device of the movable caliper, in which the brake fluid pressure is used. However, the present invention may be also applied to a disc brake device of an opposed piston type (a fixed caliper type), in which the brake fluid pressure is used.

In the above embodiment, the present invention is applied to the disc brake device of the movable caliper, in which the brake fluid pressure is used. However, the present invention may be also applied to a disc brake device, in which brake pads are pushed to the brake disc by a driving force of an electric motor.

Second Embodiment

In the above embodiment, the temperature of the brake disc D obtained from the temperature sensor 44 is used as the brake disc temperature T in the process for determining the thermal inclination (in the routine of FIG. 4). However, an estimated temperature of the brake disc D may be used as the brake disc temperature T.

Figure 7:
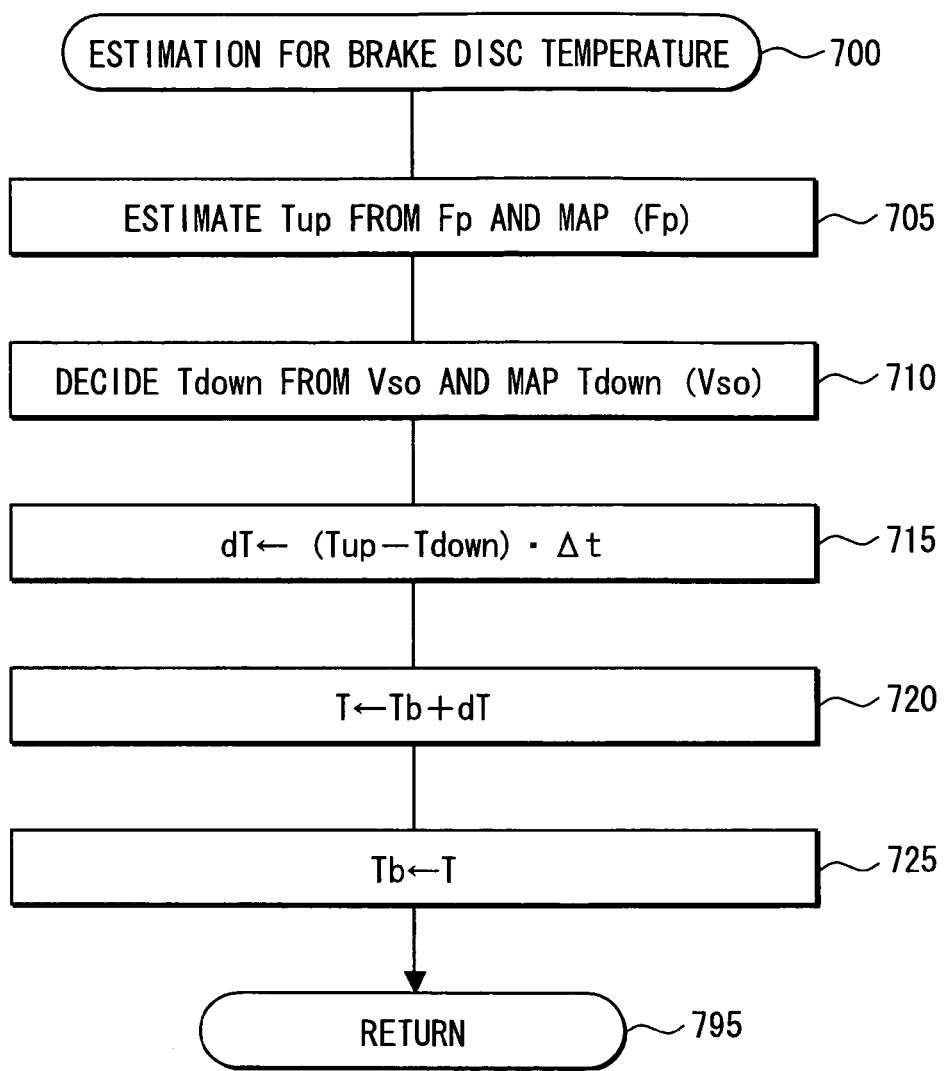
FIG. 7 is a flow chart showing a process to be carried out by CPU of a disc brake control system according to a second embodiment of the present invention, for performing the process of estimation for the brake disc temperature.

For example, the brake disc temperature T can be estimated by periodically carrying out a routine (a process) shown by the flowchart of FIG. 7 at a predetermined time interval (for example, the time interval Δt is 6 msec).

Figure 8:
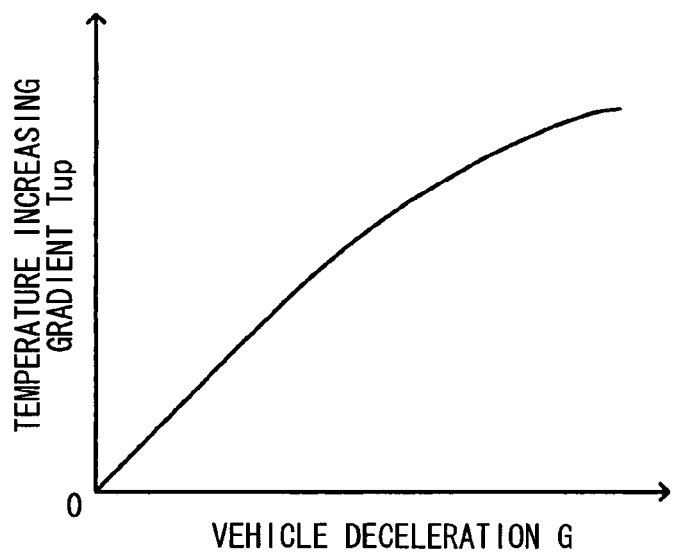
FIG. 8 is a graph showing a relation between a temperature increasing gradient of the brake disc and a vehicle deceleration.

When the process goes from a step 700 to a step 705, the CPU 51 calculates a temperature increasing gradient Tup of the brake disc D from the current vehicle deceleration G and a table, in which a relation between the vehicle deceleration G and the temperature increasing gradient Tup of the brake disc D (a speed of thermal storage to the brake disc D) is defined, as shown in FIG. 8.

The vehicle deceleration G can be calculated, for example, by differentiating a vehicle speed Vso with respect to a time, wherein the vehicle speed Vso is calculated based on a vehicle wheel speed (Vwrr, Vwfl, Vwfr, or Vwrl) obtained from the wheel speed sensor (41rr, 41fl, 41fr, or 41rl).

Figure 9:
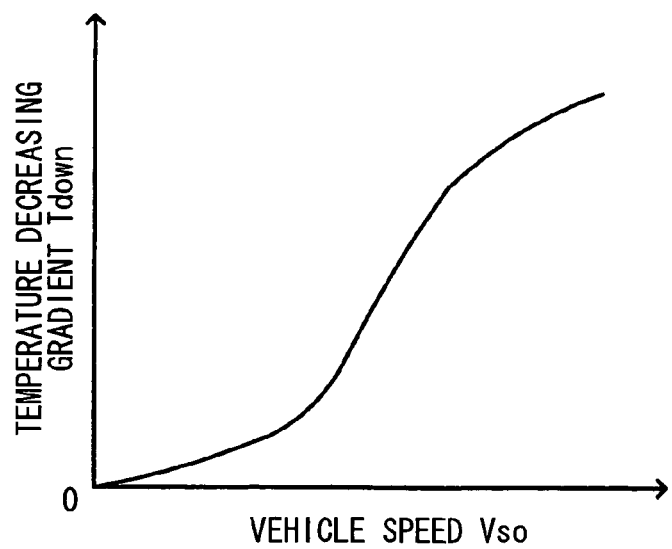
FIG. 9 is a graph showing a relation between a temperature decreasing gradient of the brake disc and a vehicle speed.

Then, the process goes to a step 710, at which the CPU 51 calculates a temperature decreasing gradient Tdown of the brake disc D from the current vehicle speed Vso and a table, in which a relation between the vehicle speed Vso and the temperature decreasing gradient Tdown of the brake disc D (a speed of heat radiation from the brake disc D) is defined, as shown in FIG. 9. The tables shown in FIGS. 8 and 9 are prepared in advance based on data obtained through experiments and/or simulations.

When the process goes to a step 715, the CPU 51 calculates a temperature increasing amount dT for the time interval Δt, from a formula shown in the step 715 based on the above calculated temperature increasing gradient Tup and temperature decreasing gradient Tdown.

The process further goes to a step 720, at which the CPU 51 updates the brake disc temperature T by adding the temperature increasing amount dT to the brake disc temperature Tb of the previous process. At the step 720 of the routine of FIG. 7, the latest value (Tb) obtained at the next step 725 of the previous process is used as the brake disc temperature Tb of the previous process.

At the step 725, therefore, the brake disc temperature Tb of the previous process is renewed by the temperature T obtained at the step 720, and the process goes to a step 795 to temporally terminate the routine of FIG. 7.

As above, the brake disc temperature T is estimated and renewed, by repeating the above routine, based on the speed Tup of thermal storage to the brake disc D obtained from the vehicle deceleration G caused by the brake pedal operation of the vehicle driver, and based on the speed Tdown of heat radiation from the brake disc D obtained from the vehicle speed Vso.

In the case that the brake disc temperature T is estimated by the routine of FIG. 7, for example, an ambient temperature, a temperature of intake air or the like at a turn-on timing of an ignition switch may be used as an initial value for the brake disc temperature T. In the case that a turn-off period of the ignition switch is longer than a predetermined period, a temperature of engine cooling water at the turn-on timing of the ignition switch may be also used as the initial value for the brake disc temperature T.

Third Embodiment

Furthermore, the determination of the thermal inclination (LEAN="1", RET="0"), or the determination of the restored condition (LEAN="0", RET="1") from the thermal inclination may be carried out based on, not the brake disc temperature T, but the vehicle deceleration G.

Figure 10:
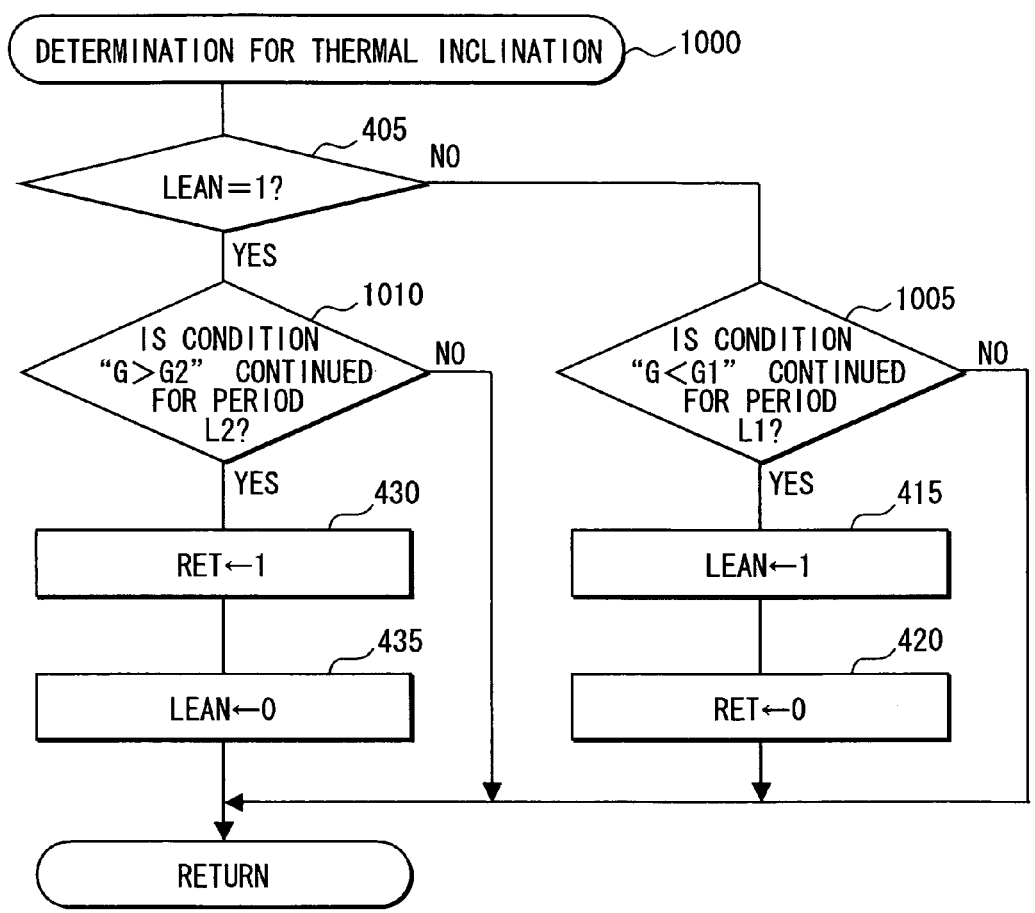
FIG. 10 is a flow chart showing a process to be carried out by CPU of a disc brake control system according to a third embodiment of the present invention, for determining the thermal inclination.

For example, the determination for the thermal inclination or the restored condition may be done by periodically carrying out a routine shown by the flowchart of FIG. 10 at a predetermined time interval (for example, the time interval Δt is 6 msec), instead of the routine of FIG. 4.

In FIG. 10, the same reference numerals are used to designate the same or similar steps to those of FIG. 4. The vehicle deceleration G has a positive value in a direction of the acceleration, and a negative value in a direction of the deceleration.

The routine of FIG. 10 is different from that of FIG. 4 in that the step 410 (FIG. 4) is replaced by a step 1005 and the step 425 (FIG. 4) is replaced by a step 1010 in FIG. 10.

At the step 1005, the CPU 51 determines "YES", when a condition in which the vehicle deceleration G is smaller than a first preset deceleration G1 (i.e. in which the vehicle deceleration G is larger than the preset deceleration G1 in the degree of the deceleration) is continued for a period longer than a first predetermined period L1. In the above determination, the first preset deceleration G1 is smaller than zero (i.e. the negative value in the direction of the deceleration), and in case of the determination of "YES", it means that the vehicle deceleration is large. In the flowchart shown in FIG. 11, the determination of "YES" (i.e. the determination of the thermal inclination) is made at a time point t12, and the values of the flag "LEAN" and the flag "RET" are respectively changed to "1" and "0".

At the step 1010, the CPU 51 determines "YES", when a condition in which the vehicle deceleration G is larger than a second preset deceleration G2 (i.e. in which the vehicle deceleration G is smaller than the preset deceleration G2 in the degree of the deceleration) is continued for a period longer than a second predetermined period L2. In the above determination, the second preset deceleration G2 is smaller than zero (i.e. the negative value in the direction of the deceleration), but larger than the first preset deceleration G1 (i.e. the deceleration G2 is smaller than the deceleration G1). Therefore, in case of the determination of "YES", it means that the vehicle deceleration is small. Accordingly, in the flowchart shown in FIG. 11, the determination of "YES" (i.e. the determination of the restored condition from the thermal inclination) is made at a time point t14, and the values of the flag "LEAN" and the flag "RET" are respectively changed to "0" and "1".

As above, the thermal inclination is determined whenever the condition of "G<G1" is continued for the period longer than the first predetermined period L1, whereas the restored condition from the thermal inclination is determined whenever the condition of "G>G2" is continued for the period longer than the second predetermined period L2, by repeating the routine of FIG. 10.

Fourth Embodiment

Figure 12:
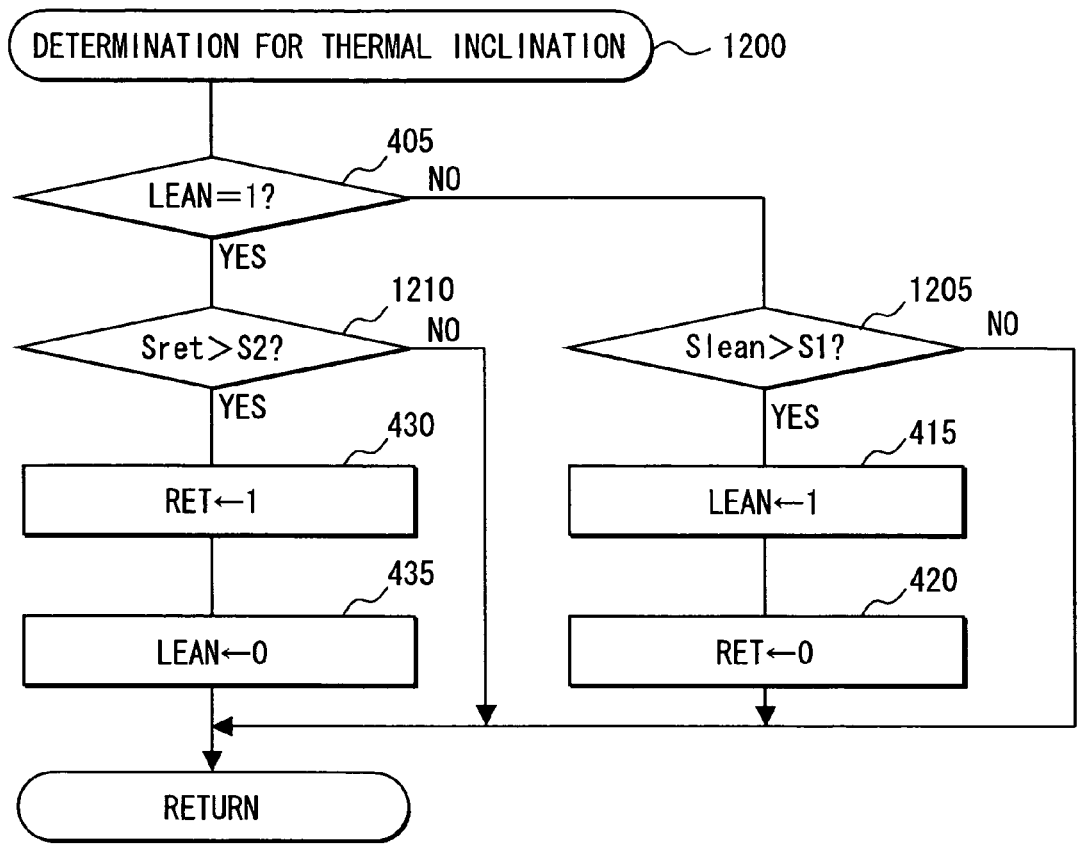
FIG. 12 is a flow chart showing a process to be carried out by CPU of a disc brake control system according to a fourth embodiment of the present invention, for determining the thermal inclination.
Figure 15:
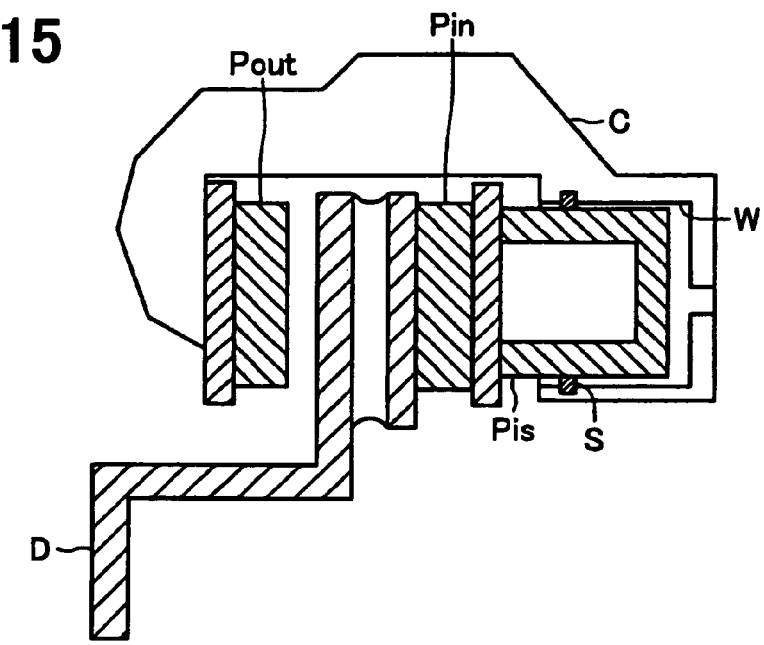
FIG. 15 is an enlarged schematic view showing a brake pad and a brake disc shown in FIG. 14C.

Furthermore, the determination for the thermal inclination or the restored condition may be done by periodically carrying out a routine shown by the flowchart of FIG. 12 at a predetermined time interval (for example, the time interval Δt is 6 msec), instead of the routine of FIG. 4.

The routine of FIG. 12 is different from that of FIG. 4 in that the step 410 (FIG. 4) is replaced by a step 1205 and the step 425 (FIG. 4) is replaced by a step 1210 in FIG. 12.

At the step 1205, the CPU 51 determines "YES" when a first time area Slean exceeds a first predetermined value S1 (S1>0).

The first time area Slean is an integrated value of the vehicle deceleration G, as shown in FIG. 13, wherein the first time area Slean is calculated from a time point (t21 in FIG. 13) at which the vehicle deceleration G is decreased to become lower than a first preset deceleration G1. The first time area Slean is calculated in accordance with the following formula (1) from zero and regularly renewed:

$$\text{Slean} = \Sigma(G1 - G) \quad (1)$$

Accordingly, in the example shown in FIG. 13, the values of the flag "LEAN" and the flag "RET" are respectively set (or changed) to "1" and "0" at a time point t22, at which the first time area Slean calculated and renewed by the formula (1) exceeds the first predetermined value S1. The determination for the thermal inclination is thus made.

At the step 1210, the CPU 51 determines "YES" when a second time area Sret exceeds a second predetermined value S2 (S2>0). The second time area Sret is an integrated value of the vehicle deceleration G, as shown in FIG. 13, wherein the second time area Sret is calculated from a time point (t24 in FIG. 13) at which the vehicle deceleration G is increased to exceed a second preset deceleration G2. The second time area Sret is calculated in accordance with the following formula (2) from zero and regularly renewed:

$$\text{Sret} = \Sigma(G - G2) \quad (2)$$

Accordingly, in the example shown in FIG. 13, the values of the flag "LEAN" and the flag "RET" are respectively set (or changed) to "0" and "1" at a time point t25, at which the second time area Sret calculated and renewed by the formula (2) exceeds the second predetermined value S2. The determination for the restored condition from the thermal inclination is thus made.

As above, the thermal inclination is determined whenever the condition of "Slean>S1", is satisfied, whereas the restored condition from the thermal inclination is determined whenever the condition of "Sret>S2" is satisfied, by repeating the routine of FIG. 12.

The thermal inclination may be determined only when the condition of "Slean>S1" is satisfied during a third predetermined period L3, which is a period from the time point (t21 in FIG. 13) for starting the calculation of the first time area Slean to a time point (t23 in FIG. 13). On the other hand, the restored condition from the thermal inclination may be determined only when the condition of "Sret>S2" is satisfied during a fourth predetermined period L4, which is a period from the time point (t24 in FIG. 13) for starting the calculation of the second time area Sret to a time point (t26 in FIG. 13).

What is claimed is:

1. A disc brake control system for a vehicle comprising:
    disc brake devices respectively provided for vehicle wheels, each having
        a brake disc to be integrally rotated with the vehicle wheel,
        a brake pad arranged to be pushed against a sliding surface of the brake disc, and an actuator for driving the brake pad, so that the brake pad is pushed to the sliding surface of the brake disc; and
    a control unit for operating the disc brake devices to control a braking operation of the vehicle,
    wherein the disc brake control system further comprises;
    a means for determining whether the brake disc is in a condition of a thermal inclination as a result of an increase of a brake disc temperature;
    a means for determining whether the brake disc is in a restored condition from the thermal inclination; and
    a means for operating the actuator in order to push the brake pad to the sliding surface of the brake disc, after the control unit determines that the brake disc is restored from the thermal inclination.

2. A disc brake control system according to claim 1, wherein
    the control unit operates the actuator to push the brake pad to the brake disc, only when a vehicle operating condition is in a condition in which a vehicle driver can not easily feel a braking force generated by the brake pad being pushed to the brake disc.

3. A disc brake control system according to claim 2, wherein
    the control unit further comprises means for determining whether an engine brake operation is carried out or not, and
    the control unit operates the actuator to push the brake pad to the brake disc, when the control unit determines that the engine brake operation is carried out.

4. A disc brake control system according to claim 3, wherein
    an adjusting device is provided for adjusting a braking force applied to the vehicle by the engine brake operation, and
    the control unit operates the adjusting device for a period during which the brake pad is pushed to the brake disc, so that the braking force by the engine brake operation is decreased by such an amount, which corresponds to the braking force generated by the brake pad being pushed to the brake disc.

5. A disc brake control system according to claim 2, wherein
    the control unit further comprises means for determining whether the vehicle is in an accelerating condition, and
    the control unit operates the actuator to push the brake pad to the brake disc, when the control unit determines that the vehicle is in the accelerating condition.

6. A disc brake control system according to claim 5, wherein
    an output power control device is provided for controlling a driving power outputted from the engine, and
    the control unit operates the output power control device for a period during which the brake pad is pushed to the brake disc, so that the driving power from the engine is increased by such an amount, which corresponds to the braking force generated by the brake pad being pushed to the brake disc.

7. A disc brake control system according to claim 2, wherein
    the control unit further comprises means for determining whether the vehicle is running on a punishing road, and
    the control unit operates the actuator to push the brake pad to the brake disc, when the control unit determines that vehicle is running on the punishing road.

8. A disc brake control system according to claim 1, wherein
a temperature detecting device is provided for detecting the brake disc temperature,
the control unit determines that the brake disc is in the condition of the thermal inclination, when the brake disc temperature exceeds a first preset temperature, and
the control unit determines that the brake disc is restored from the thermal inclination, when the brake disc temperature becomes lower than a second preset temperature, wherein the second preset temperature is lower than the first preset temperature.

9. A disc brake control system according to claim 8, wherein
the temperature detecting device comprises a temperature estimation process, and
the brake disc temperature is estimated according to the temperature estimation process, based on a speed of thermal storage to the brake disc obtained from a vehicle deceleration caused by a brake pedal operation of the vehicle driver and a speed of heat radiation from the brake disc obtained from a vehicle speed.

10. A disc brake control system according to claim 1, wherein
a deceleration detecting device is provided for detecting a vehicle deceleration,
the control unit determines whether the brake disc is in the condition of the thermal inclination or not, based on a comparison between the vehicle deceleration and a first preset deceleration, and
the control unit determines whether the brake disc is restored from the thermal inclination or not, based on a comparison between the vehicle deceleration and a second preset deceleration, wherein the second preset deceleration is smaller than the first preset deceleration in a degree of the deceleration.

11. A disc brake control system according to claim 10, wherein
the control unit determines that the brake disc is in the condition of the thermal inclination, when a condition in which the vehicle deceleration is larger in the degree of the deceleration than the first preset deceleration is continued for a period longer than a first predetermined period, and
the control unit determines that the brake disc is in the restored condition from the thermal inclination, when a condition in which the vehicle deceleration is smaller in the degree of the deceleration than the second preset deceleration is continued for a period longer than a second predetermined period.

12. A disc brake control system according to claim 10, wherein
the control unit determines that the brake disc is in the condition of the thermal inclination, when a first time area is larger than a first predetermined value, wherein the first time area is an integrated value of a deviation of the vehicle deceleration in a direction larger in the degree of the deceleration than the first preset deceleration, and
the control unit determines that the brake disc is in the restored condition from the thermal inclination, when a second time area is larger than a second predetermined value, wherein the second time area is an integrated value of a deviation of the vehicle deceleration in a direction smaller in the degree of the deceleration than the second preset deceleration.

13. A disc brake control system according to claim 12, wherein
the control unit starts a calculation for the first time area from a first time point at which the vehicle deceleration is increased in the degree of the deceleration and crosses over the first preset deceleration,
the control unit determines that the brake disc is in the condition of the thermal inclination, when the first time area exceeds the first predetermined value during a third predetermined period from the first time point,
the control unit starts a calculation for the second time area from a second time point at which the vehicle deceleration is decreased in the degree of the deceleration and crosses over the second preset deceleration, and
the control unit determines that the brake disc is in the restored condition from the thermal inclination, when the second time area exceeds the second predetermined value during a fourth predetermined period from the second time point.

14. A disc brake control system according to claim 1, wherein
each of the actuator is operated by brake fluid of the disc brake control system, and
the same brake fluid pressure is applied to all of the actuators of the disc brake devices, in order to push the brake pad to the brake disc.

15. A disc brake control system according to claim 1, wherein
the control unit further comprises means for determining whether the vehicle is in a turning operation, and
the control unit prohibits pushing of the brake pad to the brake disc, when the control unit determines that the vehicle is in the turning operation.

* * * * *